United States Patent
De et al.

(10) Patent No.: US 12,432,353 B2
(45) Date of Patent: Sep. 30, 2025

(54) ARTIFICIAL INTELLIGENCE FOR SEMI-AUTOMATED DYNAMIC COMPRESSION OF IMAGES

(71) Applicant: Microsoft Technology Licensing, LLC, Redmond, WA (US)

(72) Inventors: Titas De, Bengaluru (IN); Saurabh Uttam, Bangalore (IN); Saurabh Chawla, Bengaluru (IN); Kumar Abhishek, Bangalore (IN); Bhavatarini Mallikarjuna Pushpa, Bengaluru (IN); Sourabh Chaki, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 370 days.

(21) Appl. No.: 18/002,020

(22) PCT Filed: Apr. 22, 2021

(86) PCT No.: PCT/US2021/028525
§ 371 (c)(1),
(2) Date: Dec. 15, 2022

(87) PCT Pub. No.: WO2022/005564
PCT Pub. Date: Jan. 6, 2022

(65) Prior Publication Data
US 2023/0232017 A1    Jul. 20, 2023

(30) Foreign Application Priority Data
Jun. 29, 2020   (IN) .............................. 202041027629

(51) Int. Cl.
*G06V 10/764*   (2022.01)
*H04N 19/154*   (2014.01)

(52) U.S. Cl.
CPC ......... *H04N 19/154* (2014.11); *G06V 10/764* (2022.01)

(58) Field of Classification Search
CPC .... G06V 10/764; H04N 19/154; G06N 20/00; G06N 3/0455; G06N 3/045
See application file for complete search history.

(56) References Cited

U.S. PATENT DOCUMENTS 7,558,801 B2 * 7/2009 Getzinger ............ H04N 19/147
                                                              382/250
7,848,549 B2 * 12/2010 Steinberg ............... H04N 23/72
                                                              382/254

(Continued)

OTHER PUBLICATIONS

Communication pursuant to Article 94(3) Received in European Patent Application No. 21724928.3, mailed on Feb. 26, 2025, 7 pages.

(Continued)

*Primary Examiner* — Shaghayegh Azima

(57) ABSTRACT

In non-limiting examples of the present disclosure, systems, methods and devices for determining image compression optimums are provided. An image may be processed with a machine learning model that has been trained to identify object types in digital images. A first object and a first object type of the first object may be identified in the image. A first compressed version of the image may be generated, wherein the first compressed version has a first storage size. The first object and the first object type of the first object may be identified in the first compressed version of the image. A second compressed version of the image may be generated based on the identification of the first object and the first object type in the first compressed version of the image. The second compressed version may have a smaller storage size than the first storage size.

20 Claims, 11 Drawing Sheets

(56) References Cited

U.S. PATENT DOCUMENTS

| | | | | |
|---|---|---|---|---|
| 8,639,045 | B2* | 1/2014 | Yokomitsu | H04N 19/115 |
| | | | | 382/209 |
| 8,897,505 | B2 | 11/2014 | Gokturk et al. | |
| 9,536,324 | B1* | 1/2017 | Fram | H04N 19/895 |
| 12,260,598 | B2* | 3/2025 | Hurwitz | H04N 19/136 |
| 12,299,988 | B2* | 5/2025 | Jakobsen | G06N 3/045 |
| 2005/0131660 | A1 | 6/2005 | Yadegar et al. | |
| 2007/0065033 | A1* | 3/2007 | Hernandez | H04N 19/115 |
| | | | | 375/E7.181 |
| 2008/0112481 | A1* | 5/2008 | Hsaing | H04N 19/19 |
| | | | | 375/240.03 |
| 2018/0157907 | A1* | 6/2018 | Loginov | G06V 30/40 |
| 2018/0242003 | A1* | 8/2018 | Simon | H04N 19/182 |
| 2020/0304835 | A1* | 9/2020 | Liu | H04N 19/91 |
| 2021/0027113 | A1* | 1/2021 | Goldstein | G06F 18/24 |
| 2021/0357745 | A1* | 11/2021 | Wallis | G06N 3/04 |
| 2022/0053195 | A1* | 2/2022 | Hurwitz | G06F 18/21 |

OTHER PUBLICATIONS

Office Action received for EP Application No. 21724928.3, mailed on Sep. 25, 2023, 1 Page.

Aqqa, et al., "Understanding How Video Quality Affects Object Detection Algorithms", In Proceedings of the 14th International Joint Conference on Computer Vision, Imaging and Computer Graphics Theory and Applications, Feb. 25, 2019, pp. 96-104.

Chakrapani, et al., "Implementation of Fractal Image Compression Employing Artificial Neural Networks", In International Journal of Computational Cognition, vol. 4, Issue 4, Nov. 2008, pp. 287-295.

Choi, et al., "High Efficiency Compression for Object Detection", In Proceedings of International Conference on Acoustics, Speech and Signal Processing, Apr. 15, 2018, pp. 1792-1796.

Oravec, Milos, "Feature Extraction and Classification by Machine Learning Methods for Biometric Recognition of Face and Iris", In Proceedings of 56th International Symposium ELMAR, Sep. 10, 2014, 4 Pages.

Yuan, et al., "A Method for the Evaluation of Image Quality According to the Recognition Effectiveness of Objects in the Optical Remote Sensing Image Using Machine Learning Algorithm", In Journal of Plos One, vol. 9, Issue 1, Jan. 28, 2014, pp. 1-7.

"International Search Report and Written Opinion Issued in PCT Application No. PCT/US21/028525", Mailed Date: Jul. 13, 2021, 11 Pages.

* cited by examiner

ARTIFICIAL INTELLIGENCE FOR SEMI-AUTOMATED DYNAMIC COMPRESSION OF IMAGES

CROSS-REFERENCE TO RELATED APPLICATIONS

This application is a national stage entry under 35 U.S.C. 371 of International Application No. PCT/US2021/028525, filed Apr. 22, 2021, which claims priority to India Patent Application No. 202041027629, filed Jun. 29, 2020, and the entire contents of each is incorporated herein by reference in their entirety for all purposes.

BACKGROUND

Personal computing devices with cameras are now ubiquitous. As the cameras on those computing devices have become more sophisticated, the storage costs associated with storing the visual media generated by those devices has risen dramatically. While much of the visual media generated by computing devices can be stored in the cloud, it is expensive to do so. The vast majority of visual media generated by users does not need to be full quality and resolution to maintain its enjoyment and usefulness.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for determining image compression optimums. One or more object detection and/or object classification machine learning models may be applied to a digital image. One or more objects, object types, and/or specific objects may be identified and classified in the digital image. One or more tags may be associated with the digital image. The one or more tags may comprise a description of the objects, object types, and/or specific objects that were identified and classified. The digital image may be compressed utilizing one or more compression engines. Exemplary compression engines that may be applied to a digital image may include a channel agnostic pixel compression engine, a channel agnostic bit compression engine, a color channel down-sampling engine, and a color channel bit compression engine. In some examples, the color channel down-sampling engine and/or the color channel bit compression engine may be selectively applied to the background of a digital image (e.g., not to objects identified in a digital image).

A compressed version of a digital image may be processed by the one or more machine learning models to determine whether the same objects, object types, and/or specific objects can be identified and classified in the compressed version of the digital image. If the same objects are identified and classified in the compressed version of the digital image, the digital image may be compressed further until one or more of the same objects, object types, and/or specific objects can no longer be matched to the original digital image. The original digital image and the compressed versions of the digital image form a compression pyramid. One or more digital images in the compression pyramid may be surfaced for selection by a user. A selected digital image may replace an original digital image in storage thereby significantly reducing the amount of storage space needed to store digital visual media.

BRIEF DESCRIPTION OF THE DRAWINGS

Non-limiting and non-exhaustive examples are described with reference to the following figures.

DETAILED DESCRIPTION

Figure 1:
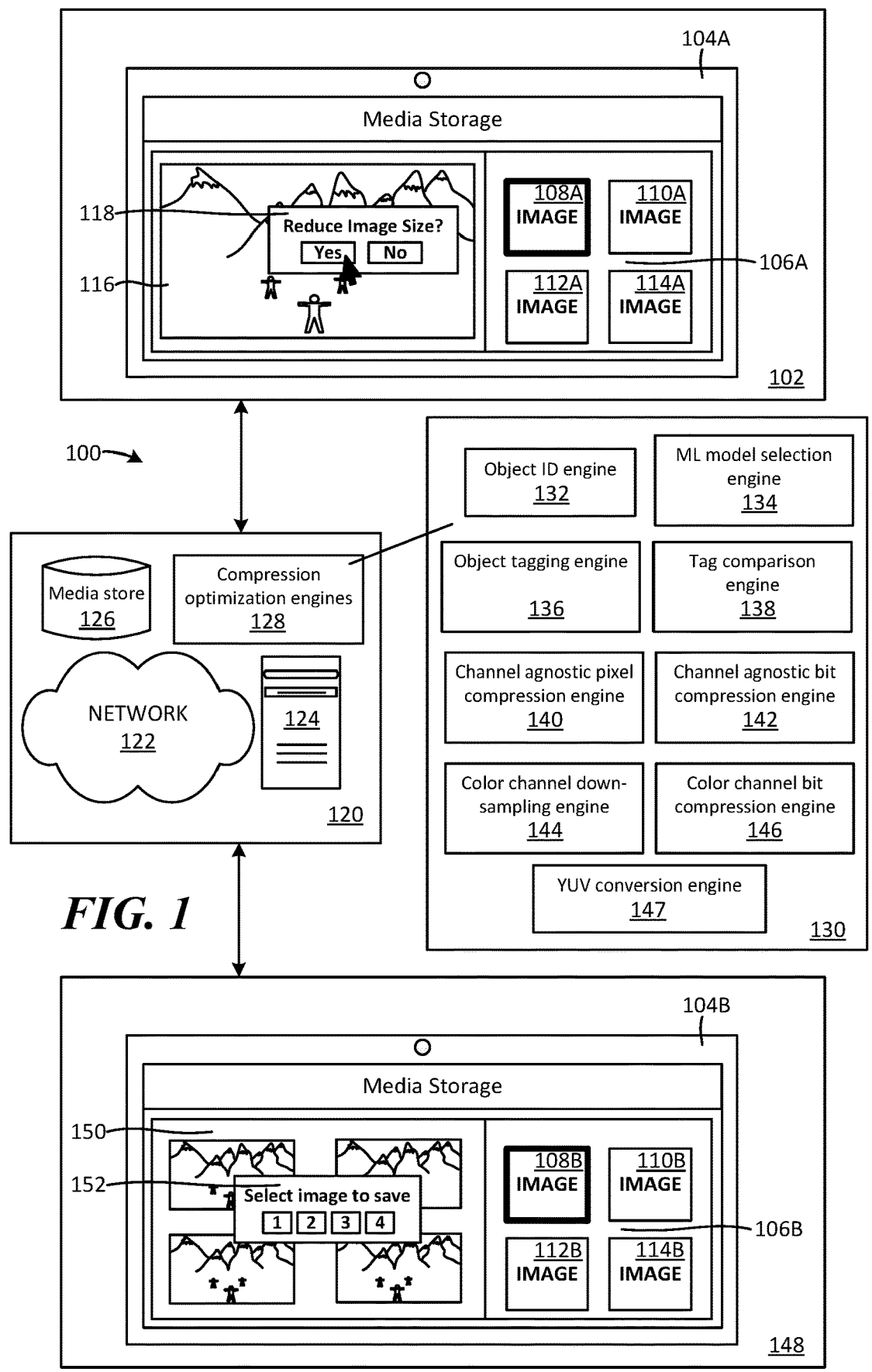
FIG. 1 is a schematic diagram illustrating an example distributed computing environment for determining image compression optimums.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for using artificial intelligence to identify visual media compression optimums. As described herein, visual media may comprise digital images and/or digital videos. Users may store visual media on one or more computing devices. In some instances, visual media may be stored in one or more cloud-based services. The computing devices and/or cloud-based storage services may be associated with user accounts from which visual media is received. The computing devices and/or cloud-based storage services may have limited storage space and/or the user accounts may only subscribe to a limited amount of storage space.

A visual media optimization service may perform operations associated with reducing the amount of storage space that is required to store visual media. The visual media optimization service may be executed all or in part as a cloud-based service. In other examples, the visual optimization service may be executed all or in part on one or more local computing devices. Although the visual media optimization service is primarily discussed herein as processing digital images, it should be understood that it may process digital videos utilizing the same or similar operations.

The visual media optimization service may receive an indication to process a digital image. The indication may include a new digital image being uploaded to a cloud-based storage service, a new digital image being generated, and/or a manual input from a user, for example. Once the indication to process a digital image is received, the visual media optimization service may process the digital image with one or more machine learning models. The one or more machine learning models may comprise one or more image processing neural networks and/or optical character recognition models. In some examples, the one or more machine learning models may have been trained to identify and classify objects and object types (e.g., persons, text, buildings, landmarks, animals, etc.) in digital images. In additional examples, the one or more machine learning models may have been trained to identify and classify specific objects within object types (e.g., specific persons, specific buildings, specific landmarks, specific letters, specific words, etc.).

Upon identifying one or more objects, object types, and/or specific objects in a digital image, the visual media optimization service may associate one or more tags with the digital image. The one or more tags may comprise metadata that comprises a description of the one or more objects, object types, and/or specific objects that were identified by the one or more machine learning models.

The visual media optimization service may generate one or more compressed versions of a digital image. In some examples, the visual media optimization service may generate the compressed versions of the digital image contemporaneously with one another. In other examples, the visual media optimization service may generate the compressed versions of the digital image sequentially. For example, the visual media optimization service may only generate a next compressed version of a digital image upon first determining that the object tags for a previously generated compressed version of the digital image match the object tags for the original digital image. That is, the visual media optimization service may apply one or more machine learning models to each compressed version of a digital image. The one or more machine learning models may comprise the same machine learning models that were applied to the original digital image.

The visual media optimization service may determine whether the same objects, object types, and/or specific objects can be identified and classified in compressed versions of a digital image. Once the machine learning models have processed a compressed version of a digital image, the visual media optimization service may apply one or more tags to the compressed digital image. The one or more tags may comprise metadata that comprises a description of the one or more objects, object types, and/or specific objects that were identified by the one or more machine learning models. The tags of a compressed digital image may then be compared with the tags for an original digital image. If the tags match (e.g., there are the same tags and corresponding object description for the compressed digital image as for the original digital image), the visual media optimization service may generate one or more additional compressed versions of the digital images that have a smaller storage size than the previously compressed digital image. This process may be repeated until the tags for a compressed digital image no longer match the tags from the original digital image. The original digital image and each of the compressed digital images comprise a digital image pyramid.

Once a determination is made that tags for a compressed digital image do not match the tags for an original digital image, the visual media optimization service may surface a plurality of the digital images from the digital image pyramid for user selection. For example, the visual media optimization service may surface the compressed version of the digital image that was one step above the compressed digital image for which the tags did not match the original digital image, one or more compressed digital images toward the middle of the compression pyramid, and in some examples, the original digital image and/or the compressed version of the digital image for which the tags did not match the original digital image. In some examples, the visual media optimization service may surface the compressed digital images with an indication of how compressed they are in relation to the original image. In some examples, the indication may comprise text and/or values describing the original size of the digital image and/or a compressed digital image. In other examples, the indication may comprise a ratio of the size of a compressed version of a digital image compared to the size of the original digital image. The size may be indicated in pixel number or storage size (e.g., megabytes, gigabytes). A user may then select which of the digital images to save in the place of the original digital image. In some examples, the visual media optimization service may surface additional compressed image versions if a determination is made that the user is not satisfied with any of the previously surfaced images. For example, an input may be received to display one or more additional image choices. In some examples, the input may comprise an indication to display higher quality images. In other examples, the input may comprise an indication to display lower quality images. Thus, based on the type of input from a user, a binary search and image selection mechanism may be utilized to identify a desired image quality for a user.

The visual media optimization service may save the compression point and/or the identities of the compression engines that were utilized in compressing a user-selected image, and in some examples, utilize that information to automatically compress images for that user account to the same or similar compression point. For example, if the visual media optimization service surfaces two compression choices for an image (e.g., a first compression choice with a higher number of pixels, and a second compression choice with a lower number of pixels), and a selection is made of the second compression choice, the visual media optimization service may surface images with fewer pixels (e.g., pixel counts similar to the second compression choice) when a next compression choice needs to be made. Similarly, the visual media optimization service may save the compression point and/or the identities of the compression engines that were utilized in compressing a user-selected image, and in some examples, utilize that information when surfacing images for selection in the future. For example, the visual media optimization service may surface compressed digital images that have compression points that are similar to the selected digital image and/or digital images that were compressed using the same or similar compression engines as the selected digital image.

The visual media optimization service may apply one or more compression engines to a digital image in generating a compression pyramid of images. Exemplary compression engines that may be applied to a digital image in generating a compression pyramid of images may include a channel agnostic pixel compression engine, a channel agnostic bit compression engine, a color channel down-sampling engine, and a color channel bit compression engine.

A channel agnostic pixel compression engine may perform operations associated with compressing an image by reducing the height and width of an image. In reducing the height and width of an image, a channel agnostic pixel compression engine may simply reduce the number of pixels included in an image, while maintaining the ratio of pixels per color channel. In examples, a minimum compression size utilizing the channel agnostic pixel compression image may be determined based on a display size of a device on which an image is surfaced. For example, if an image is surfaced on a smart phone with a screen size of X, the minimum pixel compression size will be less than for a tablet device with a screen size of X+Y.

A channel agnostic bit compression engine may perform operations associated with compressing an image by reducing the number of bits in an image. In reducing the number of bits in an image, a channel agnostic bit compression engine may reduce the number of bits by the same number in each color channel (e.g., 24 bits per color channel to 16 bits per color channel, 16 bits per color channel to 8 bits per color channel).

A color channel down-sampling engine may perform operations associated with compressing an image by down-sampling the red and blue (and alpha if present) color channels in a red, green, blue color space (RGB color space), and/or down-sampling the U and V color channels in a YUV color space. In some examples, a color channel down-sampling engine may only be applied to the background of a digital image. That is, the objects that are identified in a digital image by one or more machine learning models may be classified as foreground and the rest of a digital image may be classified as background. A color channel down-sampling engine may then be selectively applied to the background of the digital image.

A color channel bit compression engine may perform operations associated with compressing a digital image by reducing the number of bits in a digital image in the red channel and blue channel (and alpha channel if present) of the RGB color space, and U and V color channels of the YUV color space. According to some aspects, a determination as to the amount to reduce the bit number in one or more of the red channel, blue channel, U channel, and/or V channel may be determined based on analyzing a 3D histogram of a digital image. For example, a color channel that contains more information may be reduced less than a color channel that contains less information based on analysis of a 3D histogram. In some examples, a color channel bit compression engine may only be applied to the background of a digital image. That is, the objects that are identified in a digital image by one or more machine learning models may be classified as foreground and the rest of a digital image may be classified as background. A color channel bit compression engine may then be selectively applied to the background of the digital image.

The systems, methods, and devices described herein provide technical advantages for determining visual media compression optimums. Storage costs associated with storing visual media on local computing devices and in the cloud are greatly reduced via the mechanisms described herein. Digital images may be compressed to the point where the important features (e.g., objects identified via machine learning models) are still readily discernable, while some of the background information may not be as clear as in an original image. However, because users typically care the most about important features of images, and because the compression engines described herein still provide high quality and high-resolution results, the storage size of acceptable digital images can be significantly reduced.

FIG. 1 is a schematic diagram illustrating an example distributed computing environment 100 for determining image compression optimums. Computing environment 100 includes initial image sub-environment 102, network and processing sub-environment 120, optimization engines sub-environment 130, and image selection sub-environment 148.

Network and processing sub-environment 120 includes network 122, server computing device 124, media store 126, and compression optimization engines 128. Any and all of the computing devices described herein may communicate with one another via a network, such as network 122. Server computing device 124 is illustrative of a computing device that may host a visual media optimization service. Although the visual media optimization service is primarily described herein as being cloud-based, the visual media optimization service may reside and/or perform one or more operations on local computing devices (e.g., computing device 104A/104B). The visual media optimization service may be associated with media store 126. Media store 126 may store digital visual media (e.g., images, videos). For ease of explanation, the current disclosure primarily includes discussion of digital images, although it should be understood that operations discussed herein may be applied to digital images and digital videos. Visual media store 126 may store visual media associated with a plurality of user accounts (e.g., a user account associated with computing device 104A/104B, user accounts associated with smart phones, user accounts associated with digital cameras, etc.). In some examples, users may manually push visual media from one or more computing devices to media store 126 for storage. In other examples, one or more devices and/or user accounts may automatically sync visual media to media store 126 for storage. Although media store 126 is illustrated as being cloud-based, media store 126 may comprise local storage on a local computing device, such as computing device 104A/104B.

Each user account that media store 126 hosts may have same or different storage requirements and/or storage allowances. For example, a user may subscribe to a visual media storage service that includes media store 126, and the subscription may include access to a specified amount of storage space (e.g., 5 gigabytes, 20 gigabytes, etc.). The visual media optimization service, which may be included in the visual media storage service, or which may be separate from the visual media storage service, may perform operations associated with compressing visual media files included in media store 126 such that users may optimize the amount of visual media they can store in association with a storage account, while at the same time storing the visual media in an acceptable resolution and/or quality. That is, the visual media optimization service assists users in striking a balance between image/video quality, and the amount of data (e.g., number, size, length) of images/video that are stored in association with user storage accounts.

The visual media optimization service includes compression optimization engines 128, which are illustrated individually in optimization engines sub-environment 130. Optimization engines sub-environment 130 includes object identification engine 132, machine learning model selection engine 134, object tagging engine 136, tag comparison engine 138, channel agnostic pixel compression engine 140, channel agnostic bit compression engine 142, color channel down-sampling engine 144, color channel bit compression engine 146, and YUV conversion engine 147. Compression optimization engines 128 may be comprised in a single machine learning model, or a plurality of machine learning models.

The visual media optimization engine may receive an indication to compress an image (or video) in media store 126. The indication to compress the image may comprise receiving the image (e.g., the image being initially received by media store 126), a manual input (e.g., an input from a visual media application that specifies that the image should be compressed), or an automated input (e.g., settings for a user account may dictate that new images uploaded to a user account are compressed at various times or intervals). Once the indication to compress an image is received, the visual media optimization engine may utilize one or more of compression optimization engines 128 in compressing the image.

Object identification engine 132 may comprise one or more machine learning models that have been trained to identify and classify objects into type categories. For example, object identification engine 132 may receive a digital image, perform one or more preprocessing operations on the digital image, and process the digital image with a neural network. An output layer of the neural network may identify portions of the digital image that include objects and classify those objects into category types. The category types may include: person type, building type, landscape type, automobile type, animal type, etc.

Machine learning model selection engine 134 may perform operations associated with selecting and/or applying a machine learning model to objects in a digital image for further classification. For example, if object identification engine 132 identifies a person type object in a digital image, machine learning model selection engine 134 may select a person identification neural network for processing at least the portion of the digital image corresponding to the person object to further determine a specific identity of the person. In another example, if object identification engine 132 identifies a building type object in a digital image, machine learning model selection engine 134 may select a building identification neural network for processing at least the portion of the digital image corresponding to the building object to further determine a specific identity of the building (e.g., Eiffel Tower, Empire State Building).

Upon identifying one or more objects, object types, and/or specific objects in a digital image via application of object identification engine 132 and/or machine learning model selection engine 134, object tagging engine 136 may associate one or more metadata tags that include that information with the digital image. For example, if object identification engine identifies a person type object in a digital image, a building type object in the digital image, and a text type object in the digital image; a first machine learning model selected by machine learning model selection engine 134 determines that the person type object corresponds to Jane Doe, a second machine learning model selected by machine learning model selection engine 134 determines that the building type object corresponds to the Eiffel Tower; and a third machine learning model selected by machine learning model selection engine 134 determines that the text type object corresponds to "Paris Cafe", object tagging engine 136 may associate that information with the digital image as a plurality of metadata tags (e.g., a first tag for the person object type and specific person, a second tag for the building object type and specific building, a third tag for the text object type and specific text).

According to examples, object identification engine 132, machine learning selection engine 134, and object tagging engine 136 may be applied to each version of an image in a compression pyramid. For example, each of those engines may be applied to an original, full-size image, and one or more compressed versions of that original image. For example, if the image discussed above is compressed a first time to a reduced storage size, object identification engine 132, machine learning model selection engine 134, and object tagging engine 136 may be applied to that compressed version of the digital image. The tags that are associated with the compressed image via object tagging engine 136 may then be compared against the tags from the original image. Because the quality/size of the compressed image is less than the original image, one or more machine learning models may not be able to identify one of the objects or object types to a threshold value of accuracy (e.g., 90% accuracy, 95% accuracy) that were identified in the original digital image.

According to examples, the visual media optimization engine may compress an image a plurality of times, creating a pyramid of compressed images of different storage sizes. The visual media optimization engine may select a compressed image that has the smallest storage size in which all of the original tags were still identified/applied as an optimal digital image for saving. For example, if an original digital image has three tags that were identified and applied to it (e.g., person, building, text), a first compressed digital image with a smaller storage size than the original image has the same three tags that were identified and applied to it (e.g., person, building, text), and a third compressed digital image with a smaller storage size than the first compressed digital image has only two tags that were identified and applied to it (e.g., person, building), the visual media optimization engine may select the second digital image as the optimum digital image for saving. Tag comparison engine 138 may perform operations associated with comparing the tags from each of the images in a compression pyramid, and determining which images include the same tags and which images are missing tags from the original image.

In some examples, in generating a pyramid of compressed images, each progressively smaller image (e.g., based on storage space of an image) may be generated after determining that each of the original objects and tags were identified in a previously compressed image. Thus, to conserve processing resources associated with compressing many different versions of an image and processing the different compressed versions with machine learning models, the compression operations and subsequent machine learning processing of those compressed versions may be performed sequentially until an image is identified that does not include all of the original tags. In other examples, where processing costs are less of a concern, a plurality of compressed versions of a digital image may be generated contemporaneously and subsequently processed with object identification engine 132, machine learning model selection engine 134, object tagging engine 136, and/or tag comparison engine 138.

In some examples, a version of a digital image that is identified by the visual media optimization engine as being the optimum digital image for saving may be automatically saved as a replacement image for the original image. In other examples, once a version of a digital image has been identified by the visual media optimization engine as being the optimum digital image for saving, that version of the digital image may be surfaced with one or more other versions of that digital image such that a user may manually select which image to save. For example, where the digital images are being compressed sequentially, the visual media optimization engine may stop generating compressed versions of an image once the optimum digital image has been identified, and present the optimum digital image with the original image and/or one or more previously compressed versions of the digital image (e.g., images with larger storage sizes than the optimum digital image) for selection by a user. Once an image has been selected by a user as the image to save to media store 126, that image may replace the original image, or in the case that the user selects the original image, the original image may be maintained in media store 126.

In creating a pyramid of compressed images, one or more compression engines may be utilized. For example, one or more of channel agnostic pixel compression engine 140, channel agnostic bit compression engine 142, color channel down-sampling engine 144, and color channel bit compression engine 146 may be utilized in compressing one or more digital images for tagging and tag comparison to identify an optimum digital image for saving.

Channel agnostic pixel compression engine 140 may perform operations associated with compressing an image by reducing the height and width of an image. In reducing the height and width of an image, channel agnostic pixel compression engine 140 may simply reduce the number of pixels included in an image, while maintaining the ratio of pixels per color channel.

Channel agnostic bit compression engine 142 may perform operations associated with compressing an image by reducing the number of bits in an image. In reducing the number of bits in an image, channel agnostic bit compression engine 142 may reduce the number of bits by the same number in each color channel (e.g., 24 bits per color channel to 16 bits per color channel).

Color channel down-sampling engine 144 may perform operations associated with compressing an image by down-sampling the red and blue (and alpha if present) color channels in a red, green, blue color space (RGB color space), and/or down-sampling the U and V color channels in a YUV color space.

In the RGB color space, the green channel may maintain its sampling (e.g., maintain green at 1), while the red channel may be down-sampled by a factor of X (e.g., 2, 3, 4), and the blue channel may be down-sampled by a factor of Z (e.g., 2, 3, 4). In some examples, X and Z may be the same factor. In other examples X and Z may be different factors. The sampling of the green color channel may be maintained because it typically includes the maximum information as compared to the red and blue color channels.

In a specific example, if the down-sampling ratio for R:G:B is 2:1:3 (e.g., green channel is left where it is, red channel is down-sampled by a factor of 2×2, and blue channel is down-sampled by a factor of 3×3), a group of 108 pixels (R 1-36, G 1-36, B 1-36) in the original RGB color space may be converted to a group of 49 pixels (R' 1-9, G' 1-36, and B' 1-4) in the modified R'G'B' space, which is approximately a 2.2× reduction in storage space.

Alternatively, if the down-sampling ratio of R:G:B was selected as 3:1:5 based on the formulae for conversion of RGB to gray-scale (e.g., green channel is left where it is, red channel is down-sampled by a factor of 3×3, and blue channel is down-sampled by a factor of 5×5), a group of 675 pixels (R 1-225, G 1-225, B 1-225) in the original RGB color space may be converted to a group of 259 pixels (R' 1-25, G' 1-225, B' 1-9), which is approximately a 2.6× reduction in storage space.

In examples, YUV conversion engine 147 may be applied to the RGB color space, and the RGB color space may be converted to a YUV color space (e.g., YUV 411, YUV 420). In such examples, the U color channel (blue projection) may be down-sampled by a factor of X (e.g., 2, 3, 4), and the V color channel (red projection) may be down-sampled by a factor of X (e.g., 2, 3, 4). That is, the U and V color channels (the chrominance components) are down-sampled by the same factor, but that factor need not only be 2. The sampling of the Y component (luma component) may be maintained because it typically includes the maximum information as compared to the U and V color channels.

In a specific example, if the down-sampling ratio for Y:U:V is 1:3:3, then a group of 11 pixels (Y 1-9, U, V) is the representation of 27 pixels in the RGB color space (R 1-9, G 1-9, B 1-9), which is approximately a 2.45× reduction in storage space.

In another example, if the down-sampling ratio for Y:U:V is 1:4:4, then a group of 18 pixels (Y 1-16, U, V) is the representation of 48 pixels in the RGB color space (R 1-16, G 1-16, B 1-16), which is approximately a 2.67× reduction in storage space.

Color channel bit compression engine 146 may perform operations associated with compressing a digital image by reducing the number of bits in a digital image in the red channel and the blue channel (and alpha channel if present) of the RGB color space, and U and V color channels of the YUV color space.

In compressing a digital image utilizing color channel bit compression engine 146, different color channels may have their bits reduced by different factors. For example, in the RGB color space, the red color channel bits may be reduced by a factor of X bits (2, 3, 4, 5, 6), and the blue channel bits may be reduced by a factor of Z bits (2, 3, 4, 5, 6). In some examples, X and Z may be the same factor. In other examples, X and Z may be different factors. The bits in the green channel may be maintained because that channel typically includes the maximum information as compared to the red and blue color channels.

In a specific example of a 36-bit original image in the RBG color space (e.g., 12 bits for each color channel—R 12 bits, G 12 bits, B 12 bits), if the bit representation in the red color channel is reduced by a factor of 2, the bit representation in the blue color channel is reduced by a factor of 3, and the bit representation in the green color channel is kept where it is, the new bit representation by color channel is (R 6 bits, G 12 bits, B 4 bits). Thus, there is approximately a 1.64× reduction in storage space (36-bit to-22 bit).

In examples, YUV conversion engine 147 may be applied to the RGB color space, and the RGB color space may be converted to a YUV color space (e.g., YUV 411, YUV 420). In such examples, the U color channel bits may be reduced by a factor X (e.g., 2, 3, 4) and the V color channel bits may be reduced by a factor of X (e.g., 2, 3, 4). That is, the bits in the U and V color channels may be reduced by the same factor. The bits in the Y component may be maintained because it typically includes the maximum information as compared to the U and V color channels.

In a specific example of a 48-bit original image in the YUV space (e.g., 16 bits for each channel—Y 16 bits, U 16 bits, V 16 bits), if the bit representation in the U and V color channels are reduced by a factor of 2, and the bit representation in the Y color channel is kept where it is, the new bit representation by color channel is (Y 16 bits, U 8 bits, V 8 bits). Thus, there is approximately a 1.5× reduction in storage space (48-bit to 32-bit).

In compressing a digital image, color channel down-sampling engine 144 may be applied to the entire image or a portion of the digital image. In some examples, color channel down-sampling engine 144 may be applied selectively to the background of a digital image. For example, each of the objects that are identified in a digital image with object identification engine 132 may be tagged or otherwise distinguished from the remainder of the digital image. In some examples, the objects in a digital image identified with object identification engine 132 may be marked as foreground and the remainder of the digital image may be marked as background. Color channel down-sampling engine 144 may thus be applied to the background of the image, while not being applied to the foreground. Thus, the quality/resolution of the important objects in a digital image may not necessarily be reduced via application of color channel down-sampling engine 144.

In compressing a digital image, color channel bit compression engine 146 may be applied to the entire image or a portion of the digital image. In some examples, color channel bit compression engine 146 may be applied selectively to the background of a digital image. For example, each of the objects that are identified in a digital image with object identification engine 132 may be tagged or otherwise distinguished from the remainder of the digital image. In some examples, the objects in a digital image identified with object identification engine 132 may be marked as foreground and the remainder of the digital image may be marked as background. Color channel bit compression engine 146 may thus be applied to the background of the image, while not being applied to the foreground. Thus, the quality/resolution of the important objects in a digital image may not necessarily be reduced via application of color channel bit compression engine 146.

In the current example, a visual media application is displayed on computing device 104A. In some examples, the media storage application may be synced to media store 126. The media storage application includes a plurality of image thumbnails (thumbnail 108A, thumbnail 110A, thumbnail 112A, thumbnail 114A) on a right display side 106A of computing device 104A. A full original image 116 of thumbnail 108A is displayed on a left display side of computing device 104A.

In this example, an indication has been received by the visual media optimization engine to compress original image 116. That is, window 118, which states "Reduce Image Size?" with selectable options for "Yes" and "No" has been surfaced, and the "Yes" option has been selected. As such, the visual media optimization service may apply object identification engine 132, machine learning model selection engine 134, and object tagging engine 136 to original image 116 and identify and tag one or more objects and object types in original image 116. For example, the three persons in original image 116 may be tagged as person objects and/or specific persons. Similarly, the mountains in original image 116 may be tagged as mountain objects and/or specific mountains. Similarly, the sky in original image 116 may be tagged as a sky object.

The visual media optimization engine may apply one or more of the compression engines (e.g., channel agnostic pixel compression engine 140, channel agnostic bit compression engine 142, color channel down-sampling engine 144, color channel bit compression engine 146) to original image 116, and generate a first compressed version of original image 116 that has a first reduced storage size that is less than the storage size of original image 116. Object identification engine 132, machine learning model selection engine 134, and object tagging engine 136 may then be applied to the first compressed version of original image 116. Tag comparison engine 138 may then compare the tags that have been associated with the first compressed version of original image 116 with the tags of original image 116. If each of the tags are the same, original image 116 may be compressed even further. If one or more tags are missing on first compressed version of original image 116 compared to original image 116, the visual media optimization engine may determine that original image 116 should not be compressed further. This process may be repeated until a compressed version of original image is generated for which the tags do not match the tags from original image 116. That is, when the machine learning models can no longer identify each of the objects and object types in an image to within a threshold value of accuracy (e.g., 90%), the tags will no longer match and there is a high likelihood that a user will not select that image as a good enough replacement for an original image. When this happens, one or more of the compressed images, and in some cases the original image, may then be surfaced, and a user may manually select which image to save to media store 126. The one or more compressed images that are surfaced may or may not include the last image that was compressed (e.g., the image that not all of the objects and/or object types could be identified in).

Computing device 104B in image selection sub-environment 148 may be the same or a different computing device as computing device 104A. Computing device 104B includes the four image thumbnails (thumbnail 108B, thumbnail 110B, thumbnail 112B, thumbnail 114B) on the right display side 106B of the visual media application. The left side 150 of the visual media application displays four versions of original image 116. Each of the versions of original image 116 displayed on the left side 150 of the visual media application may differ in storage size, pixel number, height and/or width, color space (e.g., RGB vs YUV), bit number, color channel bit number, sampling, and/or color channel sampling based on the one or more compression engines that were utilized to generate each compressed version of the digital image. A user may select which of the four versions to save in media store 126. In this example, this selection may be made via window 152, which includes selectable elements for saving one of the four versions to media store 126. In other examples, a user may interact with one of the four displayed images. Other selection mechanisms may be utilized.

In some examples, the visual media optimization service may save information related to which image was selected and utilize that information in determining which compression engines to apply in the future for that user. For example, if a user selected an image that was reduced to storage size X, there may be a higher likelihood that the user will select images of approximately that size in the future. As such, more images of approximately that size may be surfaced for the user account to select from in the future. Similarly, if the user selected a version of the digital image that was compressed with color channel bit compression engine 146 applied only to the background, there may be a higher likelihood that the user will select images that have been compressed utilizing that engine applied to the background in the future. Thus, the visual media optimization engine may tailor its compression techniques to each specific user account that is associated with media store 126.

Figure 2:
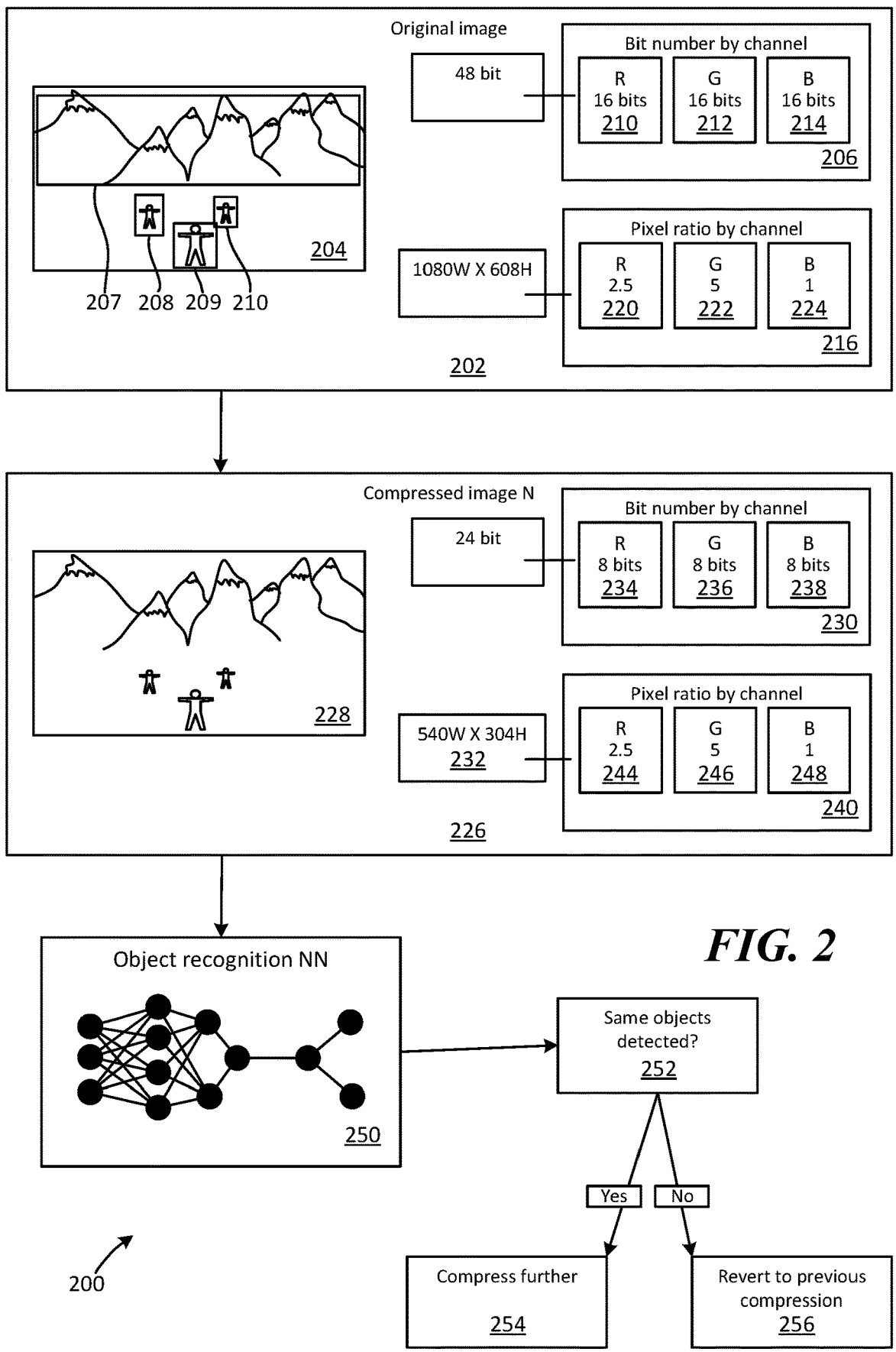
FIG. 2 is a simplified block diagram of a computing environment illustrating the compression of an image utilizing a color channel agnostic pixel compression engine and a color channel agnostic bit compression engine in the RGB color space.

FIG. 2 is a simplified block diagram of a computing environment 200 illustrating the compression of an image utilizing a color channel agnostic pixel compression engine and a color channel agnostic bit compression engine in the RGB color space. Computing environment 200 includes original image sub-environment 202, compressed image sub-environment 226, object recognition neural network 250, same objects detected element 252, further compression element 254, and revert to previous compression element 256.

Original image sub-environment 202 includes original digital image 204. Bit number by channel element 206 indicates that original digital image 204 is a 48-bit image. The bit number of original image 204 is exemplary and it should be understood that the color channel agnostic bit compression engine may be utilized on images of any bit size. Red channel bit element 210 indicates that the red color channel has 16 bits. Green channel bit element 212 indicates that the blue color channel has 16 bits. Blue channel bit element 214 indicates that the blue channel has 16 bits.

Pixel ratio by channel element 216 indicates that original digital image 204 is 1080 pixels wide and 608 pixels high. The pixel number and ratio of original digital image 204 is exemplary and it should be understood that the color channel agnostic pixel compression engine may be utilized on images of any pixel number and ratio. Red channel pixel ratio element 220, green channel pixel ratio element 222, and blue channel pixel ratio element 224 indicate that original digital image 204 has a color channel pixel ratio of R: 2.5, G: 5, B: 1.

In this example, one or more machine learning models (e.g., image neural networks) have been applied to original digital image 204. Those one or more machine learning models may have been trained to identify objects and object types in images. The one or more machine learning models have identified objects 207 and may have classified objects 207 as mountains. In some examples, the one or more machine learning models may have classified objects 207 as specific mountains (e.g., Grand Teton, Middle Teton, South Teton). The one or more machine learning models have identified objects 208, 209 and 210 and may have classified those objects as persons. In some examples, the one or more machine learning models may have classified the persons corresponding to objects 208, 209 and 210 as specific persons (e.g., John Doe, Jane Doe). The visual media optimization service may tag original digital image 204 with a description of the objects, object types, and/or specific objects that were identified by the one or more machine learning models.

Moving from original image sub-environment 202 to compressed image sub-environment 226, the color channel agnostic pixel compression engine and the color channel agnostic bit compression engine have been applied to original digital image 204 and resulted in compressed digital image 228. Compressed bit number by channel element 230 indicates that compressed digital image 228 has been compressed from 48-bit to 24-bit, and the bit value of each color channel has been reduced by half. That is, the color channel agnostic bit compression engine has equally reduced the bit value in each of the red, green, and blue channels. Specifically, compressed red channel bit element 234 indicates that the red color channel of compressed digital image 228 has 8 bits (reduced from 16), compressed green channel bit element 236 indicates that the green color channel of compressed digital image 228 has 8 bits (reduced from 16), and compressed blue channel bit element 238 indicates that the blue color channel of compressed digital image 228 also has 8 bits (reduced from 16).

Compressed pixel number element 232 indicates that the pixel number has been reduced from 1080W×608H in original digital image 204 to 540W×304H in compressed digital image 228. That is, the color channel agnostic pixel compression engine has reduced the pixel count by half (equally in the height and the width of the digital image). Additionally, compressed pixel ratio by channel element 240 indicates that in reducing the pixel count in compressed digital image 228, the ratio of pixels in each color channel has remained the same as in original digital image 204. Specifically, compressed red channel pixel ratio element 244, compressed green channel pixel ratio 246, and compressed blue channel ratio element 248 indicate that compressed digital image 228 has a color channel pixel ratio of R: 2.5, G: 5, B: 1.

One or more machine learning models are applied to compressed digital image 228. The one or more machine learning models may have been trained to identify objects and object types in images. In this example, the one or more machine learning models are illustrated as object recognition neural network 250. Once object recognition neural network 250 has processed compressed image 228, the visual media optimization service may tag compressed image 228 with a description of the objects, object types, and/or specific objects that were identified by object recognition neural network 250. A comparison may then be made between the object tags of original digital image 204 and compressed digital image 228. This is illustrated by same objects detected element 252. If a determination is made that the same objects were detected/identified, the digital image may be compressed further (e.g., the bit number and/or pixel number may be reduced further) and the processing with the neural network and comparison of tags may be repeated. This is indicated by further compression element 254. Alternatively, if a determination is made that the same objects were not detected/identified (e.g., if tags are missing for any of objects 207, 208, 209, 210), the visual media optimization service may determine that a previous compression of the digital image is the optimal digital image, and/or that compressed digital image 228 is as far as visual media optimization service is going to compress original digital image 204. This is indicated by revert to previous compression element 256. The visual media optimization service may then cause one or more versions of the digital image to be surfaced for selection by a user. A selected version of the digital image may then be saved to a visual media store.

Figure 3:
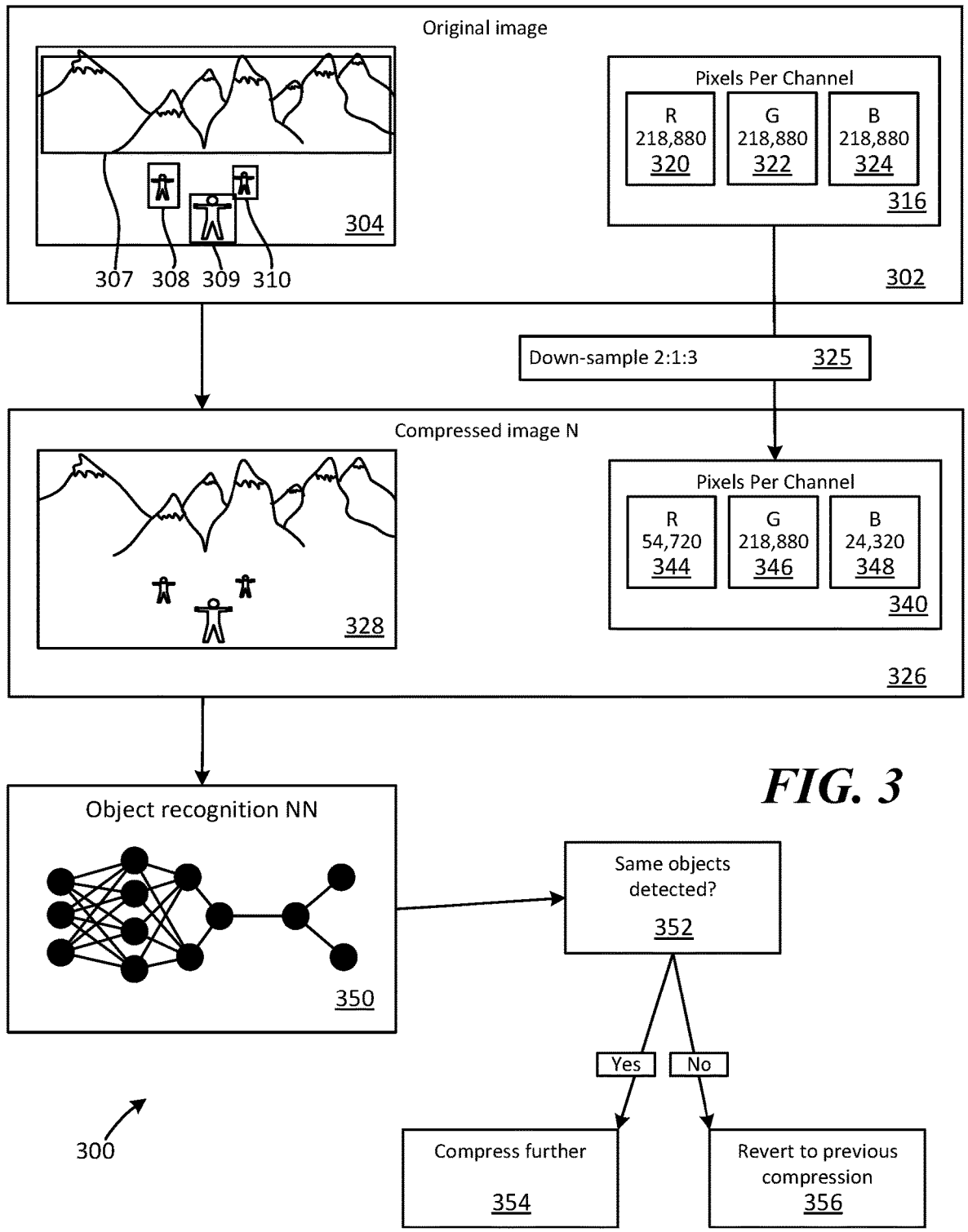
FIG. 3 is a simplified block diagram of a computing environment illustrating the compression of an image utilizing a color channel down-sampling engine in the RGB color space.

FIG. 3 is a simplified block diagram of a computing environment 300 illustrating the compression of an image utilizing a color channel down-sampling engine in the RGB color space. Computing environment 300 includes original image sub-environment 302, compressed image sub-environment 326, down-sampling element 325, object recognition neural network 350, same objects detected element 352, further compression element 354, and revert to previous compression element 356.

Original image sub-environment 302 includes original digital image 304. Pixels per channel element 316 includes red channel pixel number element 320, green channel pixel number element 322, and blue channel pixel number element 324. Red channel pixel number element 320 indicates that there 218,880 pixels in the red color channel of original digital image 304. Green channel pixel number element 322 indicates that there are 218,880 pixels in the green color channel of original digital image 304. Blue channel pixel number element 324 indicates that there are 218,880 pixels in the blue color channel of original digital image 304. It should be understood that the pixel numbers in each of the color channels are provided for exemplary purposes and the color channel down-sampling engine may be applied to color channels that include any number of pixels.

In this example, one or more machine learning models (e.g., image neural networks) have been applied to original digital image 304. Those one or more machine learning models may have been trained to identify objects and object types in images. The one or more machine learning models have identified objects 307 and may have classified objects 307 as mountains. In some examples, the one or more machine learning models may have classified objects 307 as specific mountains. The one or more machine learning models have identified objects 308, 309 and 310 and may have classified those objects as persons. In some examples, the one or more machine learning models may have classified the persons corresponding to objects 308, 309 and 310 as specific persons. The visual media optimization service may tag original digital image 304 with a description of the objects, object types, and/or specific objects that were identified by the one or more machine learning models.

Down-sampling element 325 illustrates the down-sampling ratio that is applied to the color channels of original digital image 304 in compressing it with the color channel down-sampling engine. Specifically, the down-sampling ratio that is applied is a down-sampling of the red color channel by a factor of 2 (e.g., 2×2), leaving the green color channel where it is (e.g., factor of 1), and down-sampling the red color channel by a factor of 3 (e.g., 3×3).

Although the color channel down-sampling engine is illustrated in FIG. 3 as being applied to the red, green, blue color space, the color channel down-sampling engine may be applied to the YUV color space, although original digital image 304 would first have to be converted to the YUV color space. Specifically, the U and V color channels may be down-sampled equally by the same factor (e.g., factor of 2, factor of 3, factor of 4), while leaving the Y color channel where it is.

The result of the downs-sampling is indicated in compressed image sub-environment 326. Compressed image sub-environment 326 includes compressed digital image 328 and compressed pixels per channel element 340. Compressed pixels per channel element 340 includes compressed red channel pixel number element 344, compressed green channel pixel number element 346, and compressed blue channel pixel number element 348. Compressed red channel pixel number element 344 indicates that the result of down-sampling the red color channel by a factor of two has resulted in a reduction in pixels in that channel from 218,880 pixels to 54,720 pixels (e.g., 2×2 reduction). Compressed green channel pixel number element 346 indicates that there was no down-sampling applied to that color channel, resulting in no reduction of pixels in that channel (e.g., 218,880 pixels). Compressed blue channel pixel number element 348 indicates that the result of down-sampling the blue color channel by a factor of three has resulted in a reduction in pixels in that channel from 218,880 pixels to 24,320 pixels (e.g., 3×3 reduction).

One or more machine learning models are applied to compressed image 328. The one or more machine learning models may have been trained to identify objects and object types in images. In this example, the one or more machine learning models are illustrated as object recognition neural network 350. Once object recognition neural network 350 has processed compressed image 328, the visual media optimization service may tag compressed image 328 with a description of the objects, object types, and/or specific objects that were identified by object recognition neural network 350. A comparison may then be made between the object tags of original digital image 304 and compressed digital image 328. This is illustrated by same objects detected element 352. If a determination is made that the same objects were detected/identified, the digital image may be compressed further (e.g., the red and blue color channels may be down-sampled by additional factors, one or more other compression techniques may be applied to original digital image 304 to generate a compressed image of smaller storage size than compressed digital image 328) and the processing with the neural network and comparison of tags may be repeated. This is indicated by further compression element 354. Alternatively, if a determination is made that the same objects were not detected/identified (e.g., if tags are missing for any of objects 307, 308, 309, 310), the visual media optimization service may determine that a previous compression of the digital image is the optimal digital image, and/or that compressed digital image 328 is as far as visual media optimization service is going to compress original digital image 304. The visual media optimization service may then cause one or more versions of the digital image to be surfaced for selection by a user. A selected version of the digital image may then be saved to a visual media store.

Figure 4:
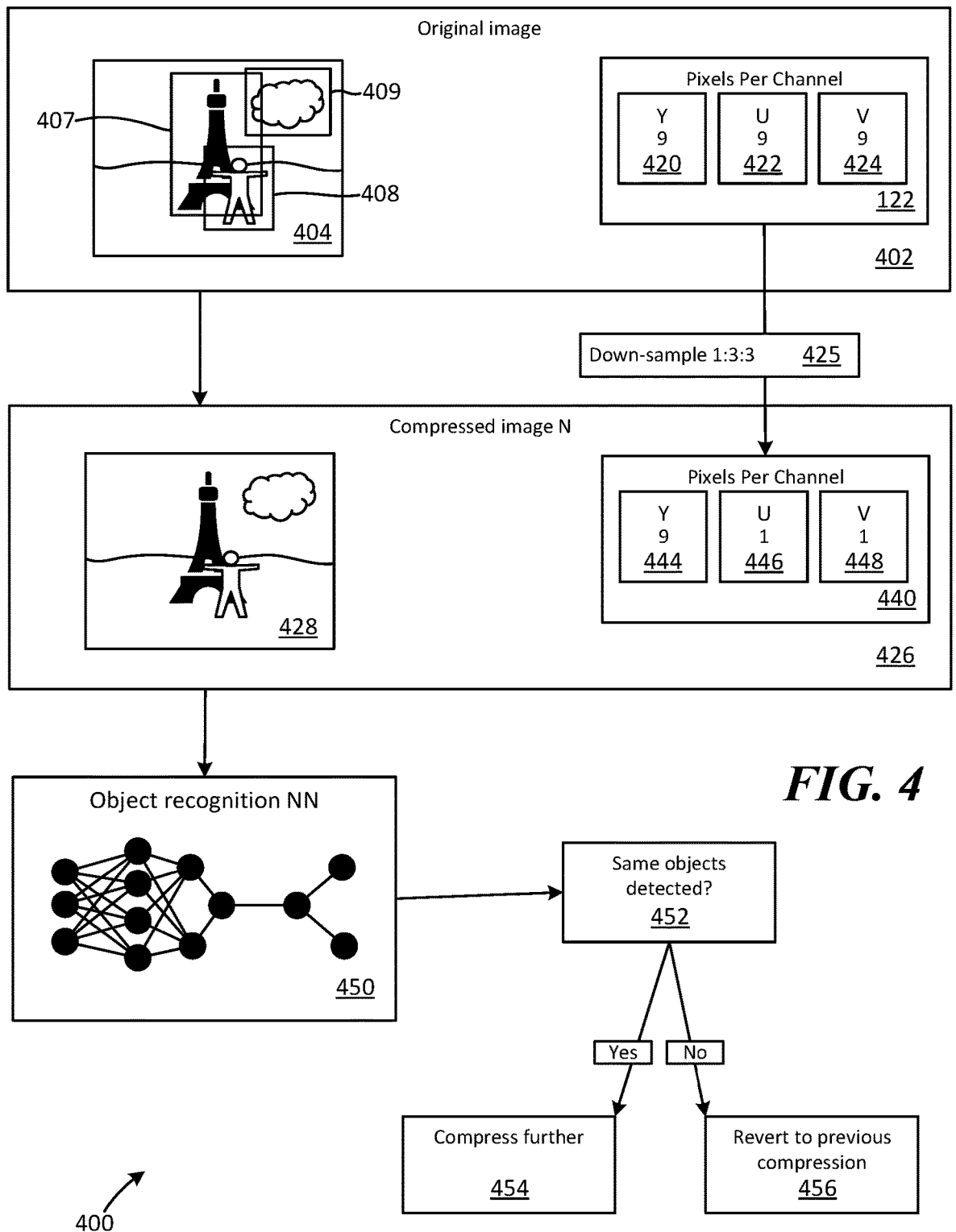
FIG. 4 is a simplified block diagram of a computing environment illustrating the compression of an image utilizing a color channel down-sampling engine in the YUV color space.

FIG. 4 is a simplified block diagram of a computing environment 400 illustrating the compression of an image utilizing a color channel down-sampling engine in the YUV color space. Computing environment 400 includes original image sub-environment 402, compressed image sub-environment 426, down-sampling element 425, object recognition neural network 450, same objects detected element 452, further compression element 454, and revert to previous compression element 456.

Original image sub-environment 402 includes original digital image 504. Pixels per channel element 416 includes Y channel pixel number element 420, U channel pixel number element 422, and V channel pixel number element 424. Y channel pixel number element 420 indicates that there are 9 pixels in the Y component/channel of original digital image 404. U channel pixel number element 422 indicates that there are 9 pixels in the U color channel of original digital image 404. V channel pixel number element 424 indicates that there are 9 pixels in the V color channel of original digital image 404. It should be understood that the pixel numbers in each of the channels (Y channel/component, U channel, V channel) are provided for exemplary purposes and the color channel down-sampling engine may be applied to channels that include any number of pixels.

In this example, one or more machine learning models (e.g., image neural networks) have been applied to original digital image 504. Those one or more machine learning models may have been trained to identify objects and object types in images. The one or more machine learning models have identified object 407 and may have classified object 407 as a building object. The one or more machine learning models may have further classified object 407 as a specific building type object (e.g., Eiffel Tower). The one or more machine learning models have identified object 408 and may have classified object 408 as a person type object. The one or more machine learning models may have further classified object 408 as a specific person (e.g., John Doe). The one or more machine learning models may have identified object 409 and classified object 408 as a cloud type object. The visual media optimization service may tag original digital image 404 with a description of the objects, object types, and/or specific objects that were identified by the one or more machine learning models.

Down-sampling element 425 illustrates the down-sampling ratio that is applied to the color channels of original digital image 404, after it has been converted to the YUV color space, in compressing it with the color channel down-sampling engine. Specifically, the down-sampling ratio that is applied is Y: 1, U:3 (e.g., 3×3), V: 3 (e.g., 3×3). Thus, the Y channel/component is left as it is and the U channel and the V channel are down-sampled equally by a factor of 3 (e.g., 3×3).

The result of the down-sampling is indicated in compressed image sub-environment 426. Compressed image sub-environment 426 includes compressed digital image 428 and compressed pixels per channel element 440. Compressed pixels per channel element 440 includes compressed Y channel pixel number element 444, compressed U channel pixel number element 446, and compressed V channel pixel number element 448. Compressed U channel pixel number element 446 indicates that the result of down-sampling the U color channel by a factor of three has resulted in a reduction in pixels in that channel from 9 pixels to 1 pixel (e.g., 3×3 reduction). Compressed V channel pixel number element 448 indicates that the result of down-sampling the V color channel by a factor of three has resulted in a reduction in pixels in that channel from 9 pixels to 1 pixel (e.g., 3×3 reduction). Compressed Y channel pixel number element 444 indicates that there was no down-sampling applied to that channel/component, resulting in no reduction of pixels in that channel (e.g., 9 pixels).

One or more machine learning models are applied to compressed image 428. The one or more machine learning models may have been trained to identify objects and object types in images. In this example, the one or more machine learning models are illustrated as object recognition neural network 450. Once object recognition neural network 450 has processed compressed image 428, the visual media optimization service may tag compressed image 428 with a description of the objects, object types, and/or specific objects that were identified by object recognition neural network 450. A comparison may then be made between the object tags of original digital image 404 and compressed digital image 428. This is illustrated by same objects detected element 452. If a determination is made that the same objects were detected/identified, the digital image may be compressed further (e.g., U and V channels may be down-sampled by additional factors, one or more other compression techniques may be applied to original digital image 404 and/or compressed digital image 428 to generate a compressed image of smaller storage size than compressed digital image 428) and the processing with the neural network and comparison of tags may be repeated. This is indicated by further compression element 454. Alternatively, if a determination is made that the same objects were not detected/identified (e.g., if tags are missing for any of objects 407, 408, or 409), the visual media optimization service may determine that a previous compression of the digital image is the optimal digital image, and/or that compressed digital image 428 is as far as visual media optimization service is going to compress original digital image 404. The visual media optimization service may then cause one or more versions of the digital image to be surfaced for selection by a user. A selected version of the digital image may then be saved to a visual media store.

Figure 5:
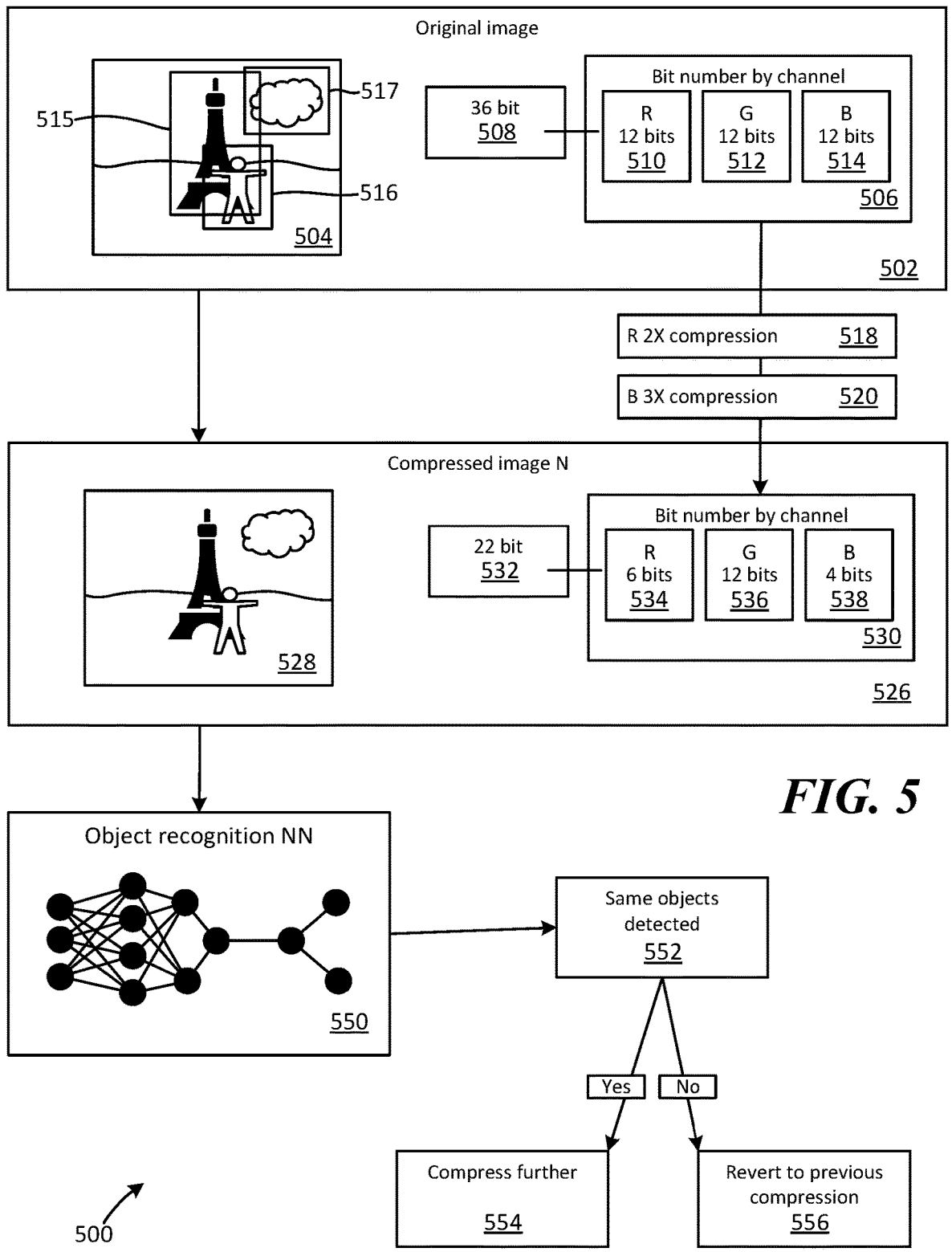
FIG. 5 is a simplified block diagram of a computing environment illustrating the compression of an image utilizing a color channel bit compression engine in the RGB color space.

FIG. 5 is a simplified block diagram of a computing environment 500 illustrating the compression of an image utilizing a color channel bit compression engine in the RGB color space. Computing environment 500 includes original image sub-environment 502, compressed image sub-environment 526, object recognition neural network 550, same objects detected element 552, further compression element 554, and revert to previous compression element 556.

Original image sub-environment 502 includes original digital image 504. Original digital image 504 is a 36-bit image as indicated by bit element 508. The bit number of original image 504 is exemplary and it should be understood that the color channel bit compression engine may be utilized on images of any bit number. Bit number by channel element 506 includes red channel bit element 510, green channel bit element 512, and blue channel bit element 514. Red channel bit element 510 indicates that the red color channel of original digital image 504 has 12 bits. Green channel bit element 512 indicates that the green channel of original digital image 504 has 12 bits. Blue channel bit element 514 indicates that the blue channel of original digital image 504 has 12 bits.

In this example, one or more machine learning models (e.g., image neural networks) have been applied to original digital image 504. Those one or more machine learning models may have been trained to identify objects and object types in images. The one or more machine learning models have identified object 515 and may have classified object 515 as a building type object. The one or more machine learning models may have classified object 515 as a specific object (e.g., Eiffel Tower). The one or more machine learning models have also identified object 516 and may have classified object 516 as a person type object. The one or more machine learning models may have classified object 516 as a specific person (e.g., John Doe). The one or more machine learning models have also identified object 517 and may have classified object 517 as a cloud type object. The visual media optimization service may tag original digital image 504 with a description of the objects, object types, and/or specific objects that were identified by the one or more machine learning models.

Bit compression element 518 indicates the factor that the color channel bit compression engine compresses the bit size of the red color channel by in compressing original digital image 504 to compressed digital image 528. That is, the red color channel is reduced from 12 bits to 6 bits (a factor of 2). Bit compression element 520 indicates the factor that the color channel bit compression engine compresses the bit size of the blue color channel by in compressing original digital image 504 to compressed digital image 528. That is, the blue color channel is reduced from 12 bits to 4 bits (a factor of 3). The bit compression factors illustrated and described in relation to FIG. 5 are exemplary and it should be understood that the color channel bit compression engine may compress the red and blue color channels by different factors. Additionally, the compression factors for the red channel and the blue channel need not necessarily be different from one another. As described herein, the color channel bit compression engine keeps the green channel bit value of the original image because that channel includes the most information.

Although the color channel bit compression engine is illustrated in FIG. 5 as being applied to the red, green, blue color space, the color channel bit compression engine may be applied to the YUV color space, although original digital image 504 would first have to be converted to the YUV color space. Specifically, the bit numbers in the U and V color channels may be reduced by a same factor (e.g., factor of 2, factor of 3, factor of 4), while leaving the Y color channel where it is.

Moving from original image sub-environment 502 to compressed image sub-environment 526, the color channel bit compression engine has been applied to original digital image 504 and resulted in compressed digital image 528. Compressed digital image 508 is a 22-bit image as indicated by bit element 532. Compressed bit number by channel element 530 includes compressed red channel bit element 534, compressed green channel bit element 536, and compressed blue channel bit element 538. Compressed red channel element 534 indicates that the red color channel of compressed digital image 528 has 6 bits (compressed down by a factor of 2 from 12 bits). Compressed green channel element 536 indicates that the green color channel of compressed digital image 528 still has 12 bits (the same as the green channel in original digital image 504). Compressed blue channel element 538 indicates that the blue color channel of compressed digital image 528 has 4 bits (compressed down by a factor of 3 from 12 bits).

One or more machine learning models are applied to compressed digital image 528. The one or more machine learning models may have been trained to identify objects and object types in images. In this example, the one or more machine learning models are illustrated as object recognition neural network 550. Once object recognition neural network 550 has processed compressed image 528, the visual media optimization service may tag compressed image 528 with a description of the objects, object types, and/or specific objects that were identified by object recognition neural network 550. A comparison may then be made between the object tags of original digital image 504 and compressed digital image 528. This is illustrated by same objects detected element 552. If a determination is made that the same objects were detected/identified, the digital image may be compressed further (e.g., the bit numbers in the blue and/or red channel may be reduced further, one or more other compression models may be applied to digital image 504 and/or digital image 528) and the processing with the neural network and comparison of tags may be repeated. This is indicated by further compression element 554. Alternatively, if a determination is made that the same objects were not detected/identified (e.g., if tags are missing for any of objects 515, 516, 517), the visual media optimization service may determine that a previous compression of the digital image is the optimal digital image for saving, and/or that compressed digital image 528 is as far as the visual media optimization service is going to compress original digital image 504. This is indicated by revert to previous compression element 556. The visual media optimization service may then cause one or more versions of the digital image to be surfaced for selection by a user. A selected version of the digital image may be saved to a visual media store.

Figure 6:
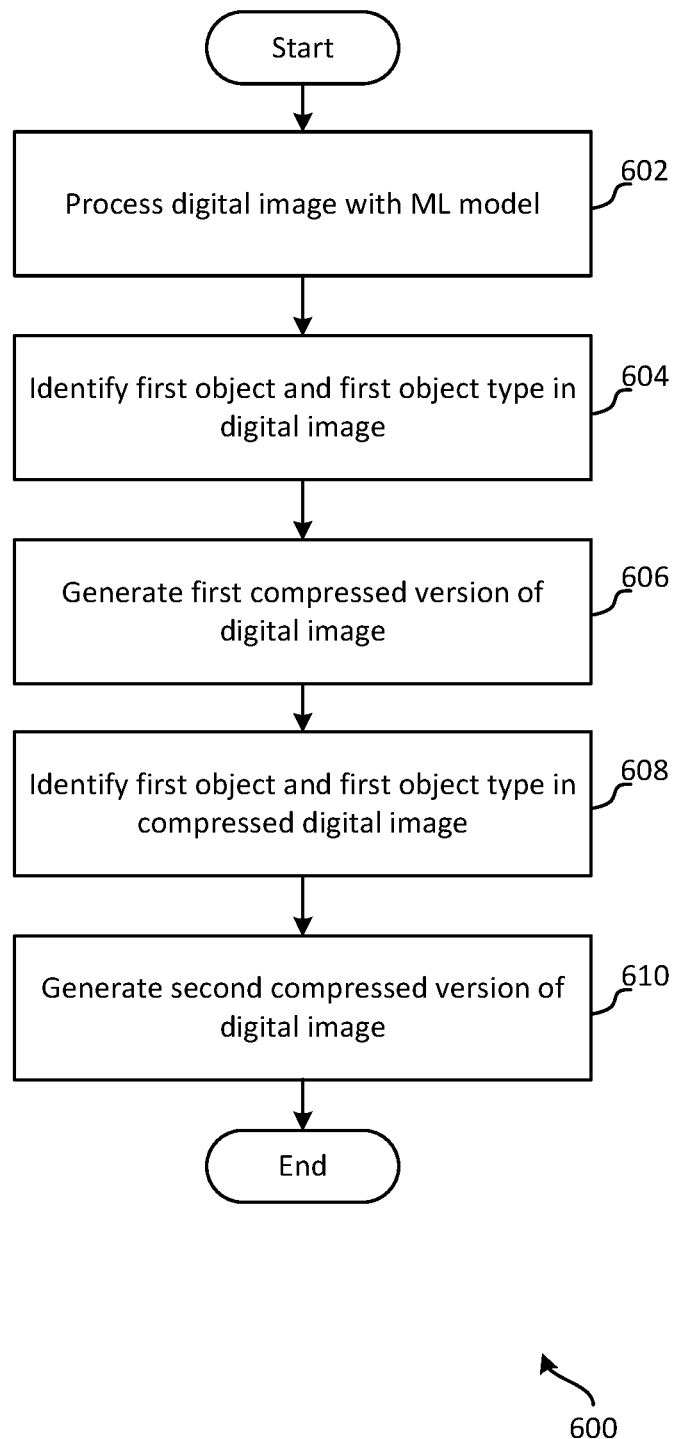
FIG. 6 is an exemplary method for determining image compression optimums.

FIG. 6 is an exemplary method 600 for determining image compression optimums. The method 600 begins at a start operation and flow moves to operation 602.

At operation 602 a digital image is processed with a machine learning model that has been trained to identify object types in digital images. The machine learning model may comprise one or more image processing neural networks. In additional examples, the machine learning model may comprise an optical character recognition model.

From operation 602 flow continues to operation 604 where a first object and a first object type are identified in the digital image based on the processing of the digital image with the machine learning model. The identification may be based on the machine learning model determining to a threshold value of accuracy (e.g., 90% accuracy, 95% accuracy) that the first object is present, and to a threshold value of accuracy (e.g., 90% accuracy, 95% accuracy) that the first object is of the first object type. Examples of the first object type may include person object type, face object type, text object type animal object type, building object type, mountain object type, etc.

From operation 604 flow continues to operation 606 where a first compressed version of the digital image having a first storage size is generated. The first compressed version of the digital image may be generated via application of one or more compression models to the digital image. Examples of compression models that may be applied include a channel agnostic pixel compression engine, a channel agnostic bit compression engine, a color channel down-sampling engine, and a color channel bit compression engine.

From operation 606 flow continues to operation 608 where the first object and the first object type of the first object are identified in the first compressed version of the digital image based on processing the first compressed version of the digital image with the machine learning model. The identification may be based on the machine learning model determining to a threshold value of accuracy (e.g., 90% accuracy, 95% accuracy) that the first object is present, and to a threshold value of accuracy (e.g., 90% accuracy, 95% accuracy) that the first object is of the first object type.

From operation 608 flow continues to operation 610 where a second compressed version of the digital image with a second storage size that is less than the first storage size is generated based on the identification of the first object and the first object type in the first compressed version of the digital image with the machine learning model. The second compressed version of the digital image may be generated via application of one or more compression models to the digital image. Examples of compression models that may be applied include a channel agnostic pixel compression engine, a channel agnostic bit compression engine, a color channel down-sampling engine, and a color channel bit compression engine.

From operation 610 flow moves to an end operation and the method 600 ends.

Figure 7:
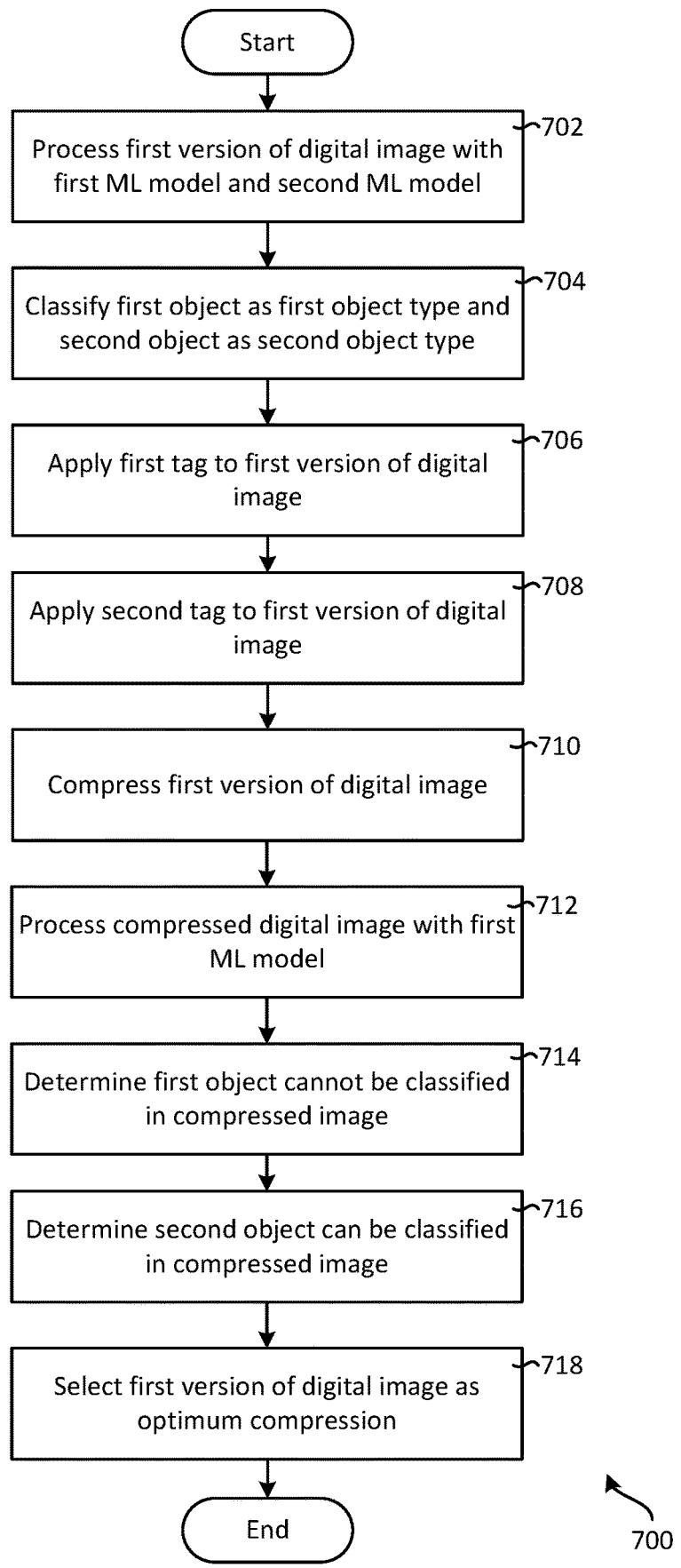
FIG. 7 is another exemplary method for determining image compression optimums.

FIG. 7 is another exemplary method 700 for determining image compression optimums. The method 700 begins at a start operation and flow moves to operation 702.

At operation 702 a first version of a digital image is processed with a first machine learning model that has been trained to classify objects of a first object type, and a second machine learning model that has been trained to classify objects of a second object type. The first machine learning model may comprise an image neural network and/or an optical character recognition model. The second machine learning model may comprise an image neural network and/or an optical character recognition model. In examples, the first version of the digital image may comprise an original (e.g., uncompressed image). In other examples, the first version of the digital image may comprise a digital image that has been compressed from an original image.

From operation 702 flow continues operation 704 where a first object is classified as the first object type in the first version of the digital image based on the processing, and a second object is classified as the second object type in the first version of the digital image based on the processing. Examples of the object types include person object type, face object type, text object type, animal object type, building object type, mountain object type, etc.

From operation 704 flow continues to operation 706 where a first tag comprising a description of the first object type is applied to the first version of the digital image. The first tag may comprise metadata that is associated with the digital image.

From operation 706 flow continues to operation 708 where a second tag comprising a description of the second object type is applied to the first version of the digital image. The second tag may comprise metadata that is associated with the digital image.

From operation 708 flow continues to operation 710 where the first version of the digital image is compressed with a first compression model. Examples of compression models that may be applied include a channel agnostic pixel compression engine, a channel agnostic bit compression engine, a color channel down-sampling engine, and a color channel bit compression engine.

From operation 710 flow continues to operation 712 where the compressed digital image is processed with the first machine learning model.

From operation 712 flow continues to operation 714 where a determination is made based on the processing of the compressed image that the first object cannot be classified as the first object type to within a threshold value of accuracy. The threshold value of accuracy may be a percentage (e.g., 90%, 95%).

From operation 714 flow continues to operation 716 where a determination is made based on the processing of the compressed image that the second object can be classified as the first object type to within a threshold value of accuracy. The threshold value of accuracy may be a percentage (e.g., 90%, 95%).

From operation 716 flow continues to operation 718 where the first version of the digital image is selected as an optimum compression of the digital image.

From operation 718 flow moves to an end operation and the method 700 ends.

Figure 8:
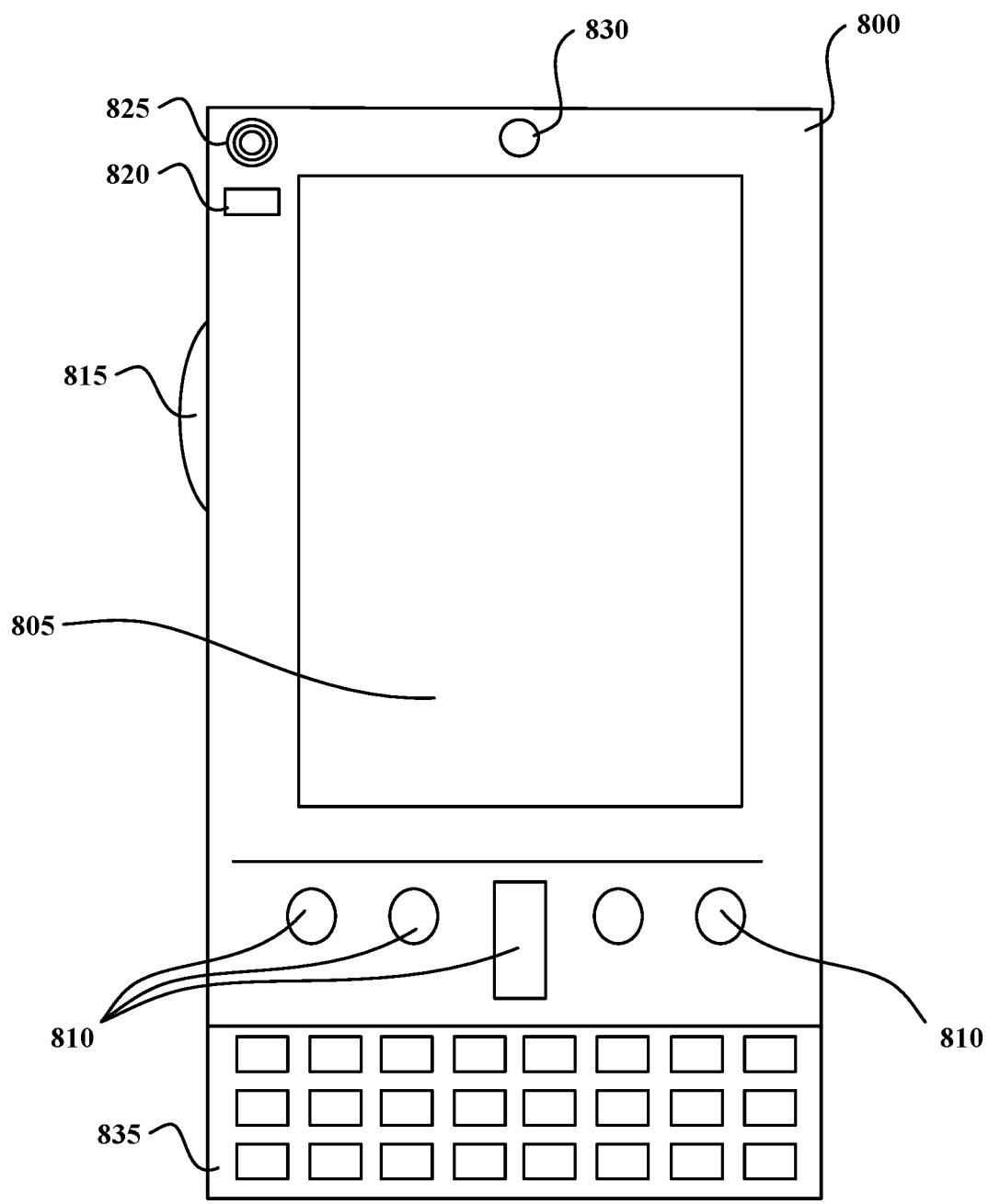
FIGS. 8 and 9 are simplified diagrams of a mobile computing device with which aspects of the disclosure may be practiced.
Figure 9:
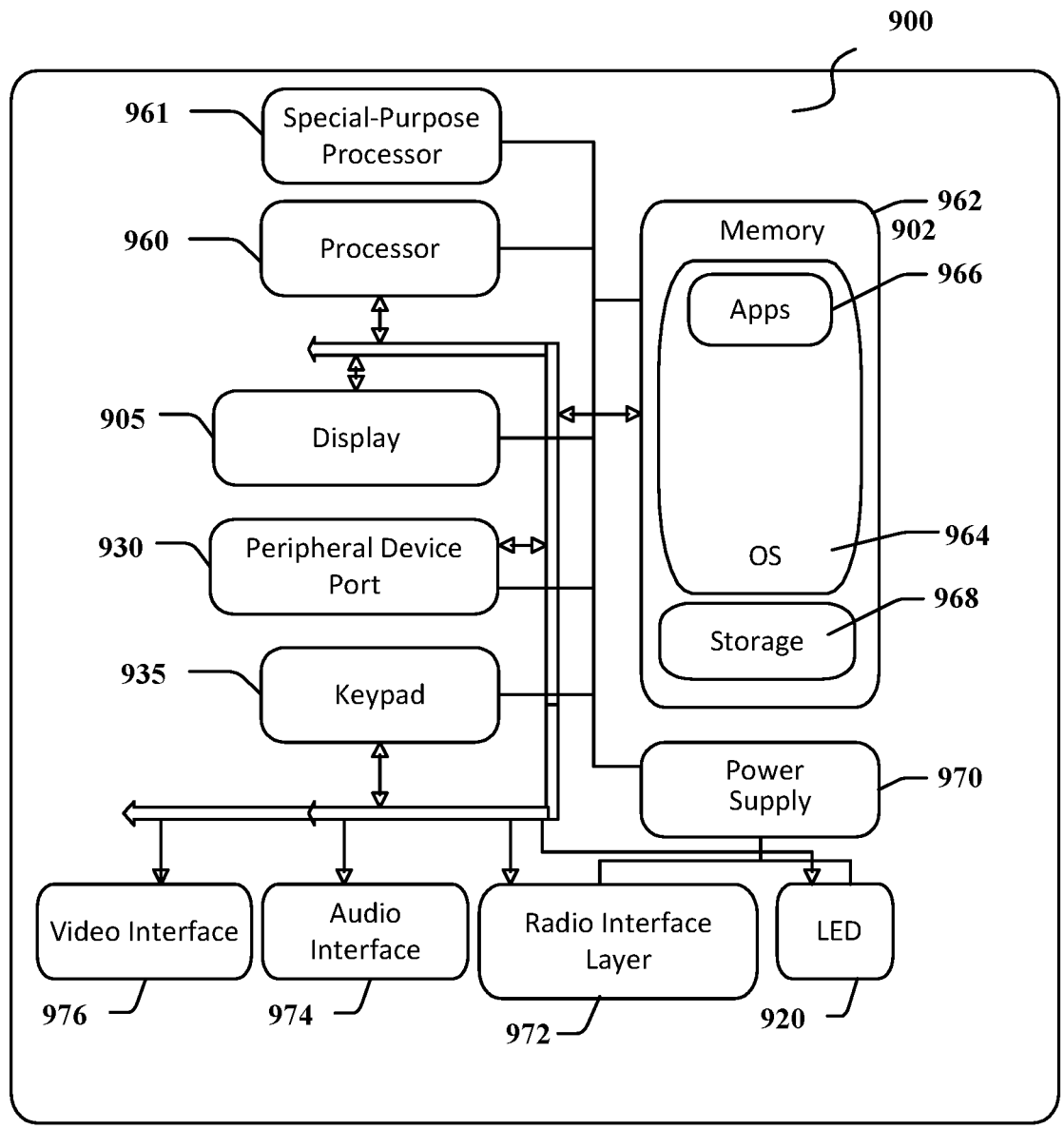

FIGS. 8 and 9 illustrate a mobile computing device 800, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or fewer input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including instructions for providing and operating visual media optimization applications.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 820 may be used to provide visual notifications, and/or an audio interface 974 may be used for producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
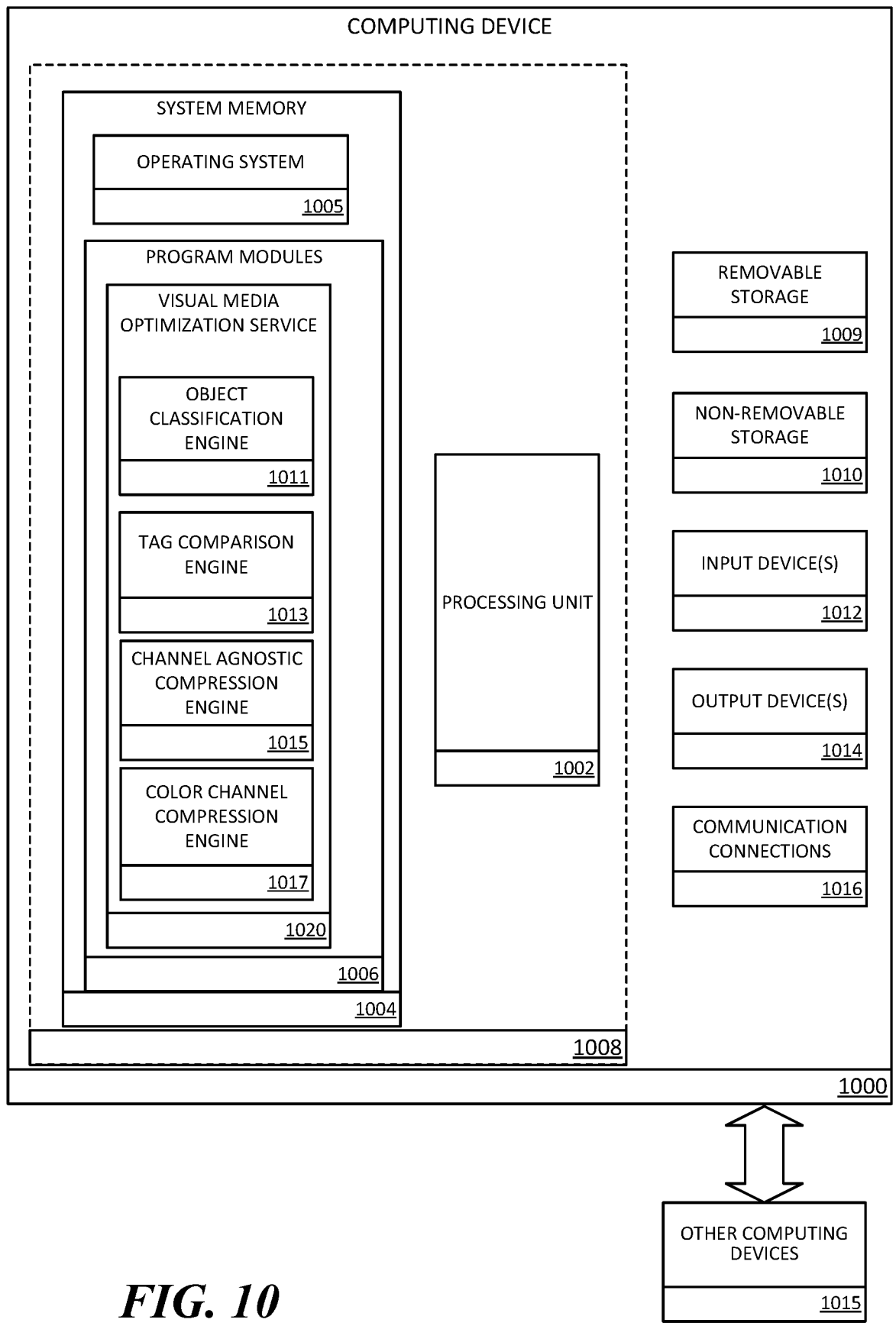
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for determining image compression optimums. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 suitable for running one or more visual media and/or visual media storage applications. The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., visual media optimization service 1020) may perform processes including, but not limited to, the aspects, as described herein. Object classification engine 1011 may perform one or more operations associated with processing a digital image and identifying and/or classifying one or more objects, object types, and/or specific objects in the digital image. Tag comparison engine 1013 may perform one or more operations associated with comparing tags of a compressed version of a digital image with tags from a non-compressed version of a digital image. Channel agnostic compression engine 1015 may perform one or more operations associated with compressing a digital image by reducing the height and width of a digital image and/or by down-sampling each color channel of a digital image by the same factor. Color channel compression engine 1017 may perform one or more operations associated with down-sampling the red and blue channels in a RGB color space by different factors and leaving the green channel where it was and/or reducing the U and V channels in a YUV color space by the same factor and leaving the Y component where it was. Color channel compression engine 1017 may additionally or alternatively perform one or more operations associated with reducing the pixel ratio of the red and blue channels by different factors in a RBG color space while leaving the green channel the same and/or reducing the pixel ratio of the U and V channels by the same factor in a YUV color space while leaving the Y component the same.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer readable media and computer storage media as described herein does not include transitory media such as a carrier wave or other propagated or modulated data signal. Computer readable storage device means hardware and does not include transitory media such as a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11:
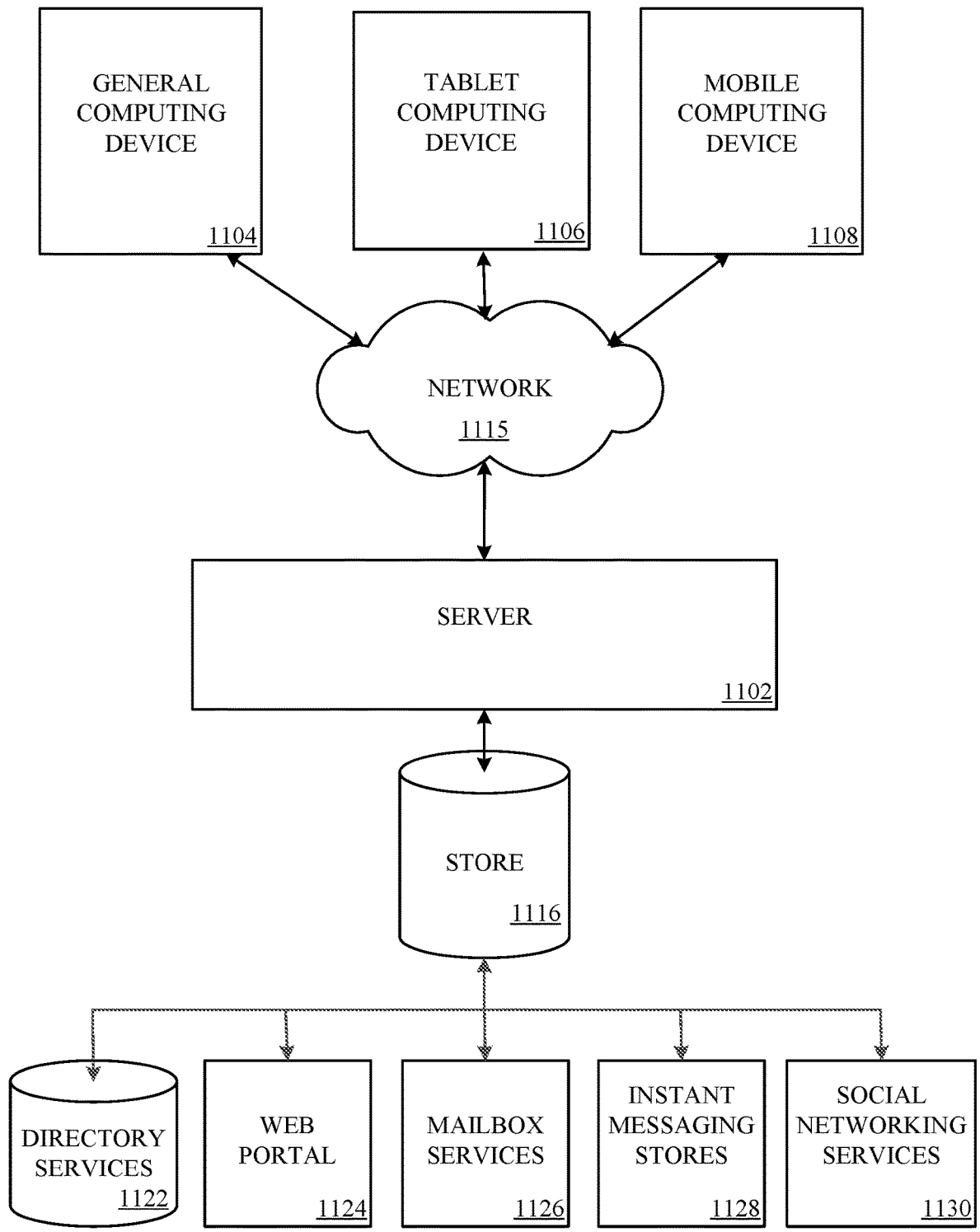
FIG. 11 is a simplified block diagram of a distributed computing system in which aspects of the present disclosure may be practiced.

FIG. 11 illustrates one aspect of the architecture of a system for processing data received at a computing system from a remote source, such as a personal/general computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. The program modules 1006 may be employed by a client that communicates with server device 1102, and/or the program modules 1006 may be employed by server device 1102. The server device 1102 may provide data to and from a client computing device such as a personal/general computer 1104, a tablet computing device 1106 and/or a mobile computing device 1108 (e.g., a smart phone) through a network 1115. By way of example, the computer system described above may be embodied in a personal/general computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A computer-implemented method for determining image compression optimums, the computer-implemented method comprising:
processing a digital image with a machine learning model that has been trained to identify object types in digital images;
identifying in the digital image, based on the processing of the digital image with the machine learning model, a first object and a first object type of the first object;
generating a first compressed version of the digital image, wherein the first compressed version has a first storage size;
identifying in the first compressed version of the digital image, based on processing the first compressed version of the digital image with the machine learning model, the first object and the first object type of the first object;
generating, based on the identification of the first object and the first object type in the first compressed version of the digital image with the machine learning model, a second compressed version of the digital image, wherein:
the second compressed version of the digital image has a second storage size that is less than the first storage size, and
generating the second compressed version of the digital image comprises applying a first compression model to the digital image, the first compression model comprising at least one of a color channel agnostic bit reduction model and a color channel agnostic pixel reduction model;

processing the second compressed version of the digital image with the machine learning model;

determining, based on processing the second compressed version of the digital image with the machine learning model, that the first object type of the first object cannot be identified to within a threshold value of accuracy in the second compressed version of the digital image; and generating, based on the determination that the first object type of the first object cannot be identified to within a threshold value of accuracy in the second compressed version of the digital image, a third version of the digital image, wherein generating the third version of the digital image comprises applying a spatially selective color channel down-sampling model to the digital image.

2. The computer-implemented method of claim 1, further comprising:

determining, based on processing the third version of the digital image with the machine learning model, that the first object type of the first object cannot be identified to within a threshold value of accuracy in the third version of the digital image; and selecting the first compressed version of the digital image as an optimum compression of the digital image.

3. The computer-implemented method of claim 1, wherein:

the spatially selective color channel down-sampling model is applied to at least one of: a blue channel of a red, green, blue color space of the digital image; and a red channel of the red, green, blue color space of the digital image; and a green channel of the red, green, blue color space of the digital image is not compressed via application of the spatially selective color channel down-sampling model.

4. The computer-implemented method of claim 1, wherein:

the spatially selective color channel down-sampling model is applied to at least one of: a U channel of a YUV color space of the digital image; and a V channel of the YUV color space of the digital image; and a Y channel of the YUV color space of the digital image is not compressed via application of the spatially selective color channel down-sampling model.

5. The computer-implemented method of claim 1, wherein the spatially selective color channel down-sampling model is applied to a background of the digital image and not the first object.

6. The non-transitory computer-implemented method of claim 2, further comprising:

surfacing the first compressed version of the digital image for selection.

7. The non-transitory computer-implemented method of claim 3, wherein:

the spatially selective color channel down-sampling model is applied to the blue channel and the red channel; and the blue channel is down-sampled by a different factor than the red channel.

8. A non-transitory computer-readable storage device comprising executable instructions that, when executed by a processor, assist with determining image compression optimums, the computer-readable storage device including instructions executable by the processor for:

processing a digital image with a machine learning model that has been trained to identify object types in digital images;

identifying in the digital image, based on the processing of the digital image with the machine learning model, a first object and a first object type of the first object;

generating a first compressed version of the digital image, wherein the first compressed version has a first storage size;

identifying in the first compressed version of the digital image, based on processing the first compressed version of the digital image with the machine learning model, the first object and the first object type of the first object;

generating, based on the identification of the first object and the first object type in the first compressed version of the digital image with the machine learning model, a second compressed version of the digital image, wherein:

the second compressed version of the digital image has a second storage size that is less than the first storage size, and generating the second compressed version of the digital image comprises applying a first compression model to the digital image, the first compression model comprising at least one of a color channel agnostic bit reduction model and a color channel agnostic pixel reduction model;

processing the second compressed version of the digital image with the machine learning model;

determining, based on processing the second compressed version of the digital image with the machine learning model, that the first object type of the first object cannot be identified to within a threshold value of accuracy in the second compressed version of the digital image; and generating, based on the determination that the first object type of the first object cannot be identified to within a threshold value of accuracy in the second compressed version of the digital image, a third version of the digital image, wherein generating the third version of the digital image comprises applying a spatially selective color channel down-sampling model to the digital image.

9. The computer-readable storage device of claim 8, wherein the executable instructions comprise further instructions executable by the processor for:

determining, based on processing the third version of the digital image with the machine learning model, that the first object type of the first object cannot be identified to within a threshold value of accuracy in the third version of the digital image; and selecting the first compressed version of the digital image as an optimum compression of the digital image.

10. The non-transitory computer-readable storage device of claim 8, wherein:

the spatially selective color channel down-sampling model is applied to at least one of: a blue channel of a red, green, blue color space of the digital image; and a red channel of the red, green, blue color space of the digital image; and a green channel of the red, green, blue color space of the digital image is not compressed via application of the spatially selective color channel down-sampling model.

11. The non-transitory computer-readable storage device of claim 10, wherein:
the spatially selective color channel down-sampling model is applied to the blue channel and the red channel; and
the blue channel is down-sampled by a different factor than the red channel.

12. The non-transitory computer-readable storage device of claim 8, wherein:
the spatially selective color channel down-sampling model is applied to at least one of: a U channel of a YUV color space of the digital image; and a V channel of the YUV color space of the digital image; and
a Y channel of the YUV color space of the digital image is not compressed via application of the spatially selective color channel down-sampling model.

13. The non-transitory computer-readable storage device of claim 8, wherein the spatially selective color channel down-sampling model is applied to a background of the digital image and not the first object.

14. A system for determining image compression optimums, comprising:
a memory for storing executable program code; and
a processor, functionally coupled to the memory, the processor being responsive to computer-executable instructions contained in the program code and operative to:
process a digital image with a machine learning model that has been trained to identify object types in digital images;
identify in the digital image, based on the processing of the digital image with the machine learning model, a first object and a first object type of the first object;
generate a first compressed version of the digital image, wherein the first compressed version has a first storage size;
identify in the first compressed version of the digital image, based on processing the first compressed version of the digital image with the machine learning model, the first object and the first object type of the first object;
generate, based on the identification of the first object and the first object type in the first compressed version of the digital image with the machine learning model, a second compressed version of the digital image, wherein:
the second compressed version of the digital image has a second storage size that is less than the first storage size, and
to generate the second compressed version of the digital image comprises applying a first compression model to the digital image, the first compression model comprising at least one of a color channel agnostic bit reduction model and a color channel agnostic pixel reduction model;
process the second compressed version of the digital image with the machine learning model;
determine, based on processing the second compressed version of the digital image with the machine learning model, that the first object type of the first object cannot be identified to within a threshold value of accuracy in the second compressed version of the digital image; and
generate, based on the determination that the first object type of the first object cannot be identified to within a threshold value of accuracy in the second compressed version of the digital image, a third version of the digital image, wherein to generate the third version of the digital image comprises applying a spatially selective color channel bit reduction model to the digital image.

15. The system of claim 14, wherein the computer-executable instructions contained in the program code are further operative to:
determine, based on processing the third version of the digital image with the machine learning model, that the first object type of the first object cannot be identified to within a threshold value of accuracy in the third version of the digital image; and
select the first compressed version of the digital image as an optimum compression of the digital image.

16. The system of claim 15, wherein the computer-executable instructions contained in the program code are further operative to:
surface the first compressed version of the digital image for selection.

17. The system of claim 14, wherein:
the spatially selective color channel bit reduction model is applied to at least one of: a blue channel of a red, green, blue color space of the digital image; and a red channel of the red, green, blue color space of the digital image; and
a green channel of the red, green, blue color space of the digital image is not compressed via application of the spatially selective color channel bit reduction model.

18. The system of claim 17, wherein:
the spatially selective color channel bit reduction model is applied to the blue channel and the red channel; and
the blue channel has its bits reduced by a different factor than the red channel.

19. The system of claim 14, wherein:
the spatially selective color channel bit reduction model is applied to at least one of: a U channel of a YUV color space of the digital image; and a V channel of the YUV color space of the digital image; and
a Y channel of the YUV color space of the digital image is not compressed via application of the spatially selective color channel bit reduction model.

20. The system of claim 14, wherein the spatially selective color channel bit reduction model is applied to a background of the digital image and not the first object.

* * * * *